(12) United States Patent
Jain et al.

(10) Patent No.: US 11,417,036 B1
(45) Date of Patent: Aug. 16, 2022

(54) SYSTEMS FOR GENERATING INDICATIONS OF PERCEPTUAL LINEAR REGIONS OF VECTOR OBJECTS

(71) Applicant: Adobe Inc., San Jose, CA (US)

(72) Inventors: Arushi Jain, Ashok Vihar (IN); Praveen Kumar Dhanuka, Howrah (IN); Matthew David Fisher, San Carlos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/324,337

(22) Filed: May 19, 2021

(51) Int. Cl.
*G06T 11/20* (2006.01)

(52) U.S. Cl.
CPC ........ *G06T 11/203* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2008/0297514 A1* | 12/2008 | Pedersen | ................. | G06T 11/40 345/442 |
| 2010/0067066 A1* | 3/2010 | Honma | ................. | G06V 30/182 382/199 |
| 2010/0098339 A1* | 4/2010 | Kido | ................. | G06T 7/155 382/199 |
| 2018/0122083 A1* | 5/2018 | Wang | ................. | G06T 7/168 |
| 2019/0317980 A1* | 10/2019 | Dhanuka | ................. | G06F 40/166 |
| 2021/0209941 A1* | 7/2021 | Maheshwari | ........ | G06V 10/426 |

OTHER PUBLICATIONS

"Snap objects to glyph", Adobe Illustrator User Guide [online], Adobe Inc. [retrieved Apr. 14, 2021]. Retrieved from the Internet <https://helpx.adobe.com/in/illustrator/using/snap-to-glyph.html>., Apr. 8, 2021, 10 pages.

Kim, Byungsoo et al., "Semantic Segmentation for Line Drawing Vectorization Using Neural Networks", Computer Graphics Forum, vol. 37, No. 2 [retrieved Apr. 14, 2021], Retrieved from the Internet <http://www.byungsoo.me/project/vectornet/paper.pdf>., May 22, 2018, 10 pages.

(Continued)

*Primary Examiner* — Jeffrey J Chow
(74) *Attorney, Agent, or Firm* — FIG. 1 Patents

(57) ABSTRACT

In implementations of systems for generating indications of perceptual linear regions of vector objects, a computing device implements a linear region system to receive input data describing an outline of a vector object. The linear region system determines differences between sequential points of the outline and linear approximation lines projected through the sequential points. The linear region system combines a first linear group and a second linear group of the linear groups into a combined group based on a linearity constraint. An indication of a perceptual linear region of the vector object is generated for display in a user interface based on the combined group.

20 Claims, 23 Drawing Sheets

(56) References Cited

OTHER PUBLICATIONS

McCrae, James et al., "Sketching Piecewise Clothoid Curves", SBM'08: Proceedings of the Fifth Eurographics conference on Sketch-Based Interfaces and Modeling [retrieved Apr. 14, 2021]. Retrieved from the Internet <http://diglib.eg.org/bitstream/handle/10.2312/SBM.SBM08.001-008/001-008.pdf?sequence=1&isAllowed=y>., Jun. 2008, 8 pages.

Williams, Lance R. et al., "Perceptual Completion of Occluded Surfaces", Computer Vision and Image Understanding, vol. 64, No. 1 [retrieved Apr. 14, 2021]. Retrieved from the Internet <https://www.cs.unm.edu/~williams/williams_phd.pdf>., Jul. 1996, 20 pages.

* cited by examiner

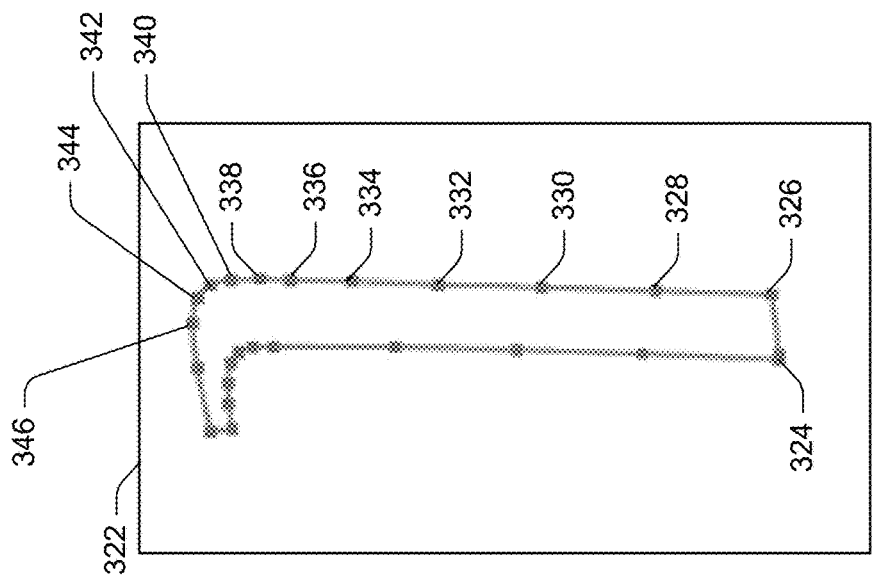
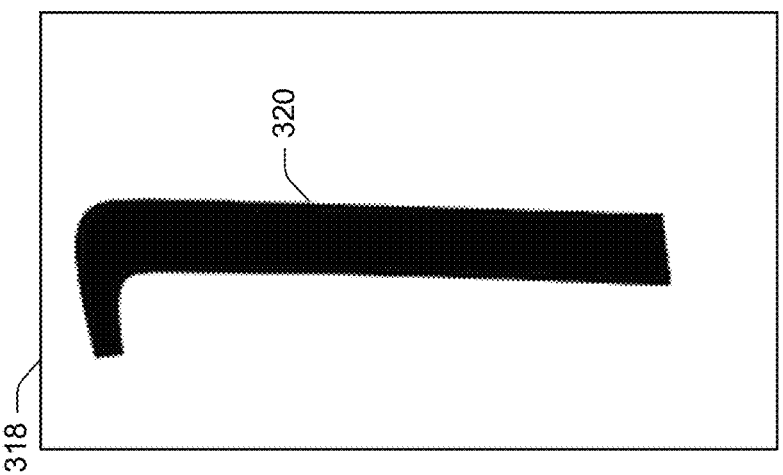
Fig. 3A

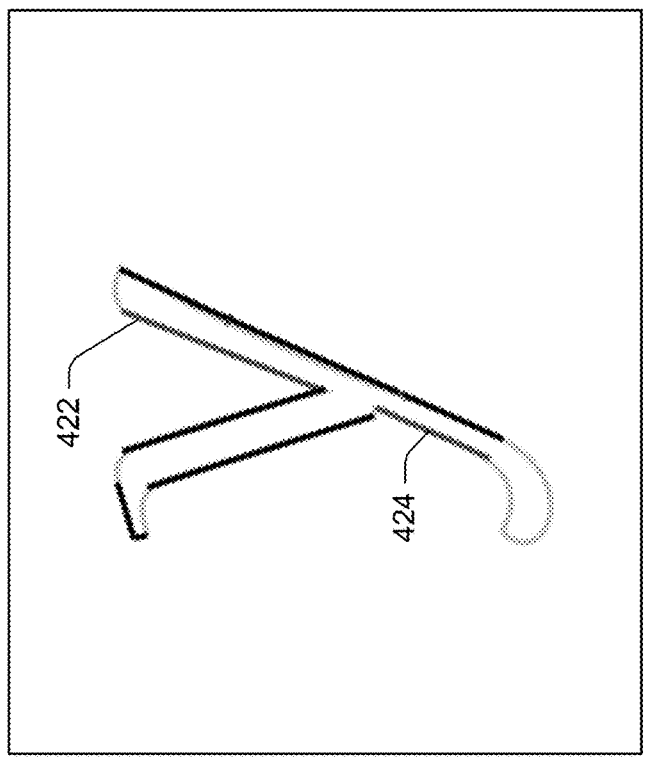
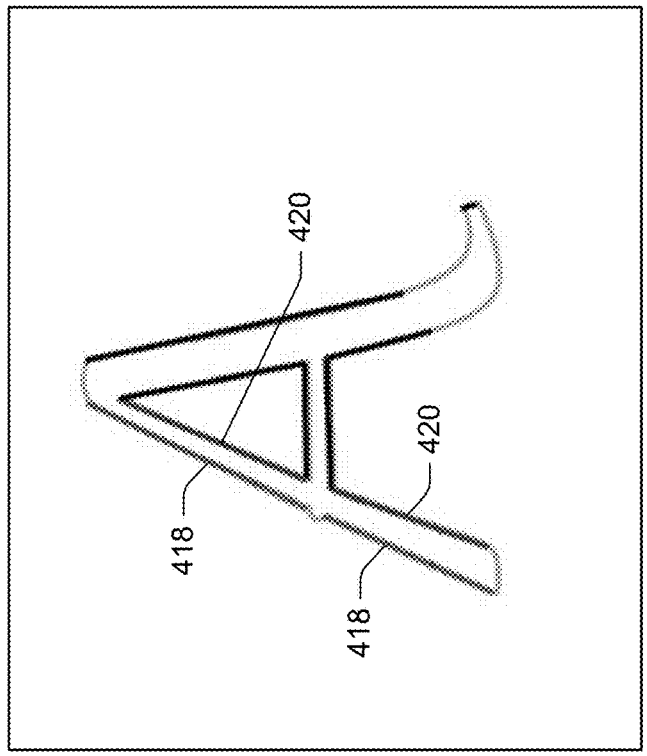
Fig. 44

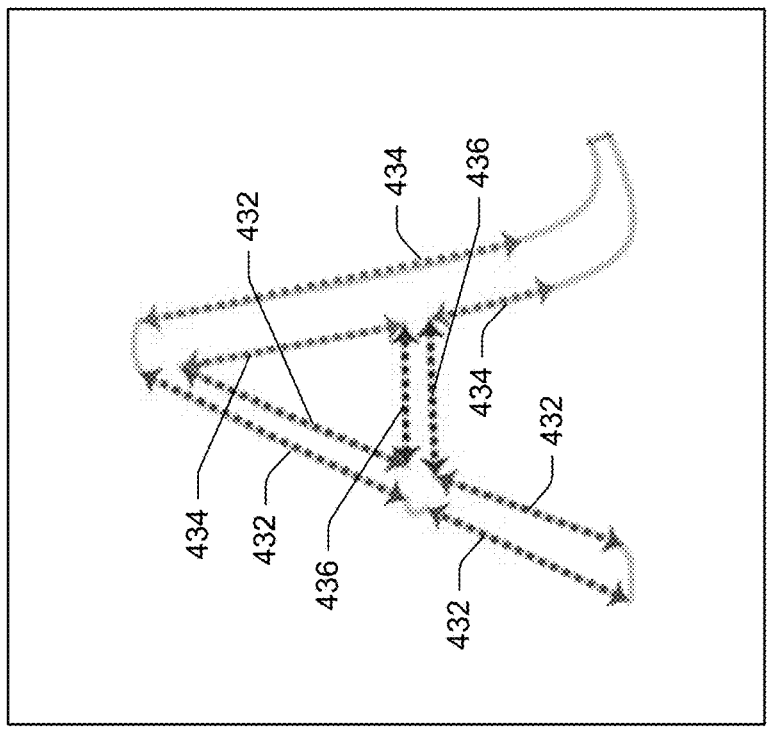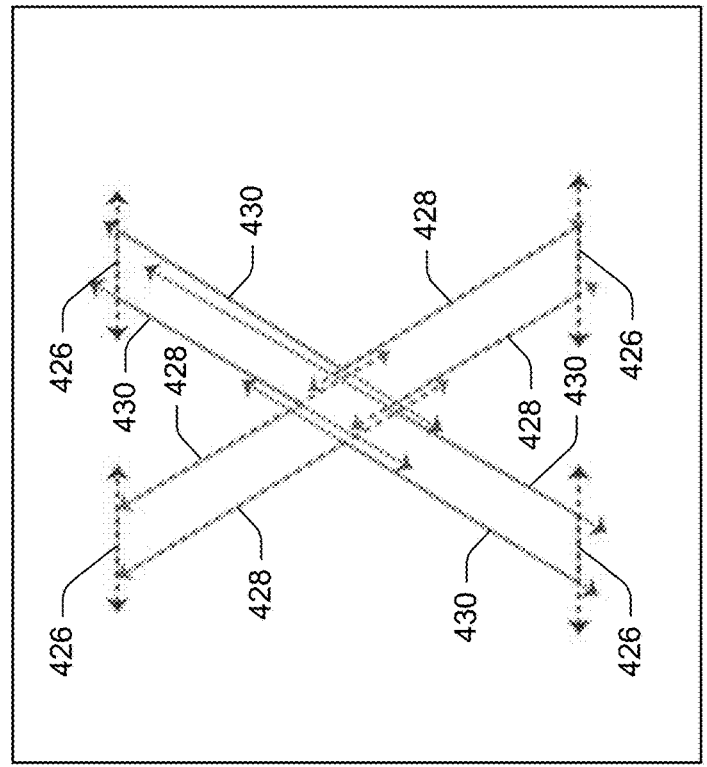
Fig. 4B

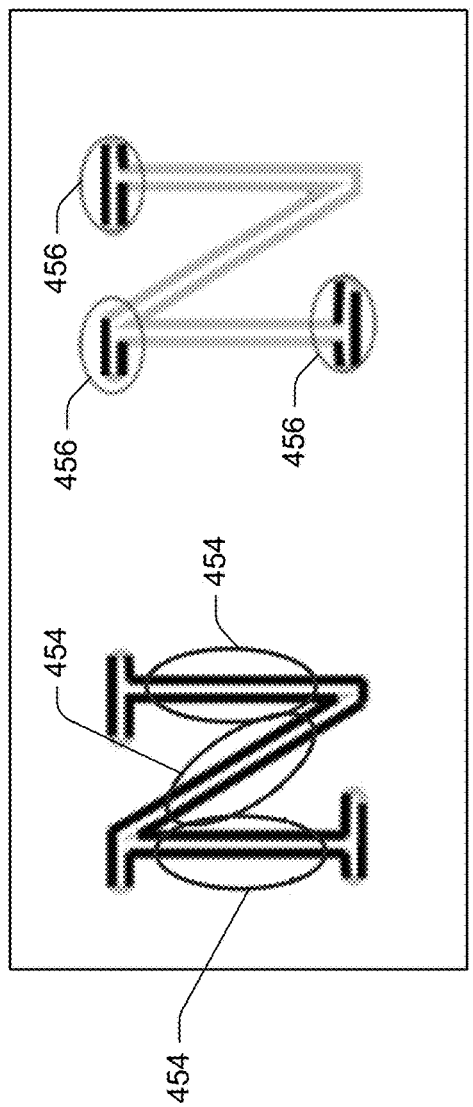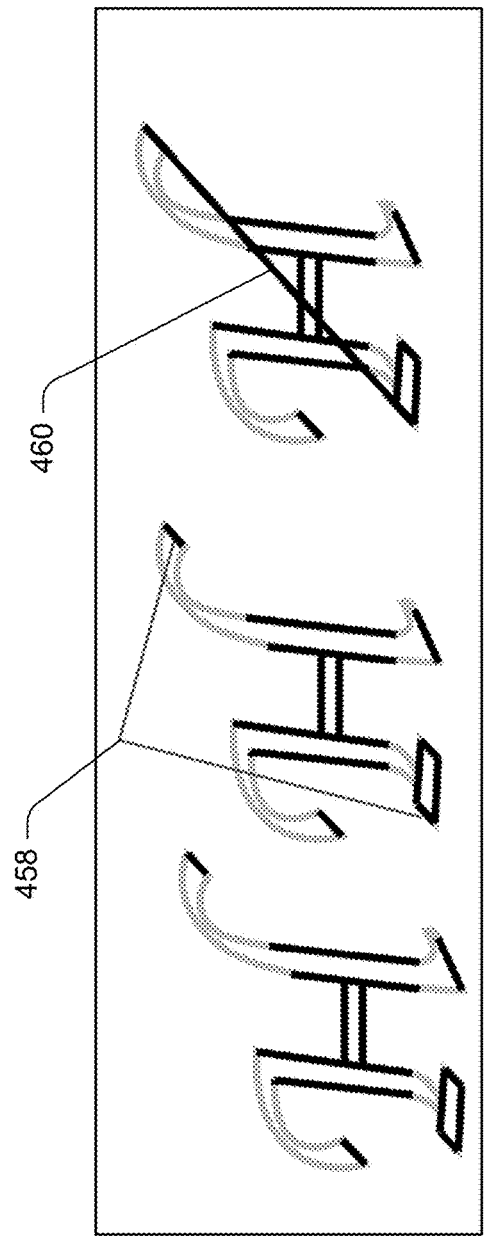
Fig. 4G

500

502
Receive input data describing an outline of a vector object

504
Determine differences between sequential points of the outline and linear approximation lines projected through the sequential points

506
Group the sequential points into linear groups based on the differences

508
Combine a first linear group and a second linear group of the linear groups into a combined group based on a linearity constraint

510
Generate, for display in a user interface, an indication of a perceptual linear region of the vector object based on the combined group

*Fig. 5*

SYSTEMS FOR GENERATING INDICATIONS OF PERCEPTUAL LINEAR REGIONS OF VECTOR OBJECTS

BACKGROUND

In applications for creating and editing digital content, precise alignment of digital objects within the content is fundamental for conveying visual relationships between the objects. Even a slight misalignment of a vector object or a glyph of a font within the digital content is easily perceivable and not aesthetically pleasing. In order to reduce instances of such misalignments, conventional systems include alignment guides which are usable to precisely align vector objects such as glyphs within digital content.

These conventional systems detect geometrically linear regions of a glyph and display indications of the detected linear regions as the alignment guides. An alignment guide causes a cursor or a portion of a vector object within a threshold proximity of the alignment guide to relocate such that the cursor or the portion of the vector object is collocated with the alignment guide. For example, a user of the system interacts with an input device (e.g., a mouse, a stylus, a keyboard, etc.) to manipulate the glyph via the alignment guide and precisely align the glyph, for example, with another glyph.

Conventional systems are limited to detecting geometrically linear regions of glyphs. This is a shortcoming of these systems because many glyphs include portions that are visually perceivable as being linear but the portions are not geometrically linear. For example, a stem of a glyph appears to be linear but actually includes a slight curvature. In this example, because the stem of the glyph is not geometrically linear, conventional systems are not capable of detecting the stem or displaying an indication of the detected stem as an alignment guide.

SUMMARY

Techniques and systems are described for generating indications of perceptual linear regions of vector objects. In an example, a computing device implements a linear region system to receive input data describing an outline of a vector object such as a glyph of a font or any other vector object. The linear region system determines differences between sequential points of the outline and linear approximation lines projected through the sequential points. For example, a distance between a sequential point and a linear approximation line projected through the point is a difference between the sequential point and the linear approximation line.

The linear region system groups the sequential points into linear groups based on these differences. In one example, the linear region system combines a first linear group and a second linear group of the linear groups into a combined group based on a linearity constraint. An indication of a perceptual linear region of the vector object is generated for display in a user interface based on the combined group. For example, the indication is a snap guide usable to precisely align the vector object with another vector object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, 3D, 3E, 3F, 3G, 3H, and 3I illustrate an example of grouping sequential points of an outline of a vector object into linear groups.

FIGS. 4A, 4B, 4C, 4D, 4E, 4F, 4G, 4H, and 4I illustrate examples of combining linear groups into combined groups for generating indications of perceptual linear regions of vector objects.

FIG. 5 is a flow diagram depicting a procedure in an example implementation in which input data describing an outline of a vector object is received and an indication of a perceptual linear region of the vector object is generated for display in a user interface.

DETAILED DESCRIPTION

Overview

Figure 1:
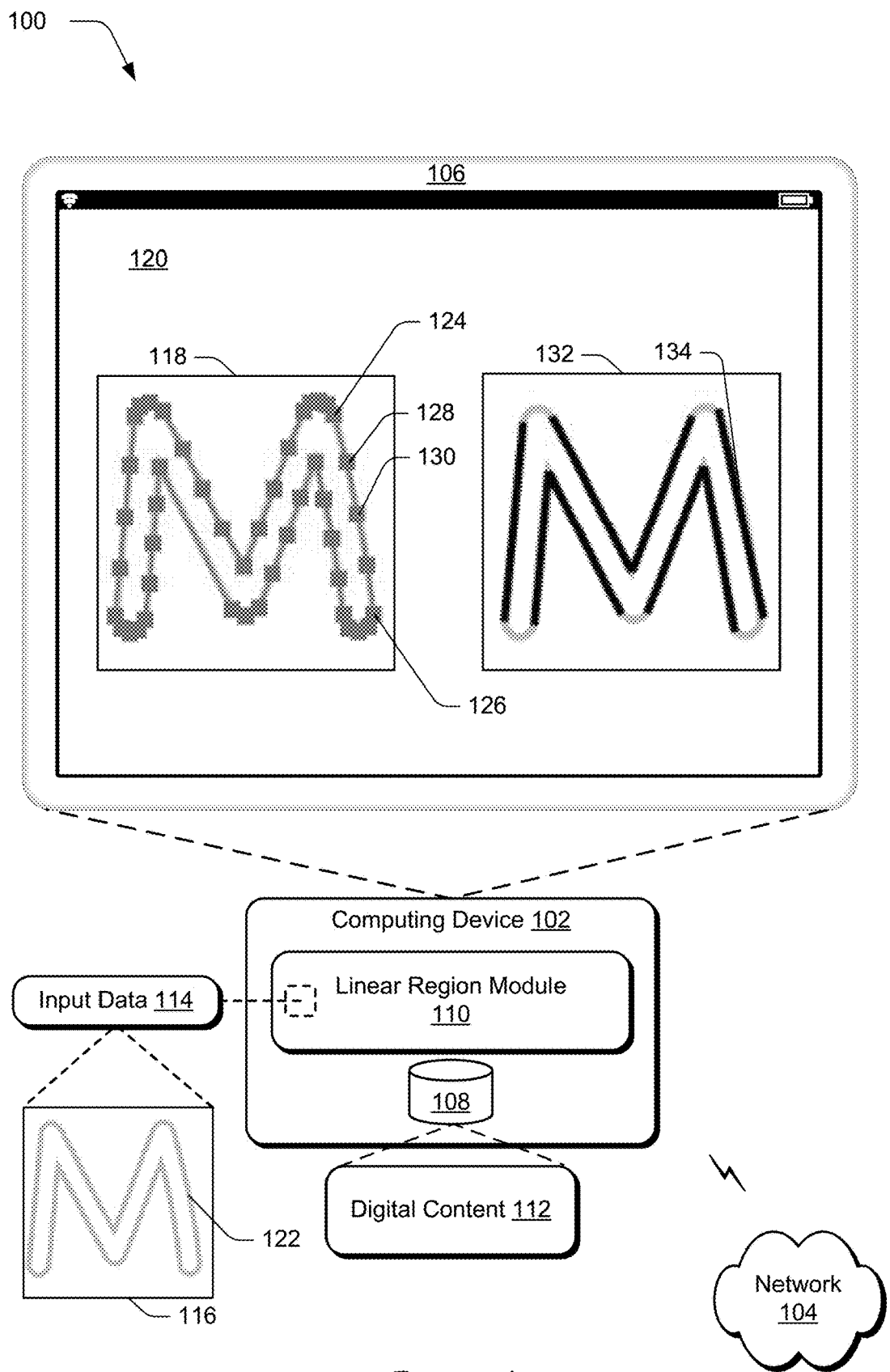
FIG. 1 is an illustration of an environment in an example implementation that is operable to employ digital systems and techniques for generating indications of perceptual linear regions of vector objects as described herein.

Vector objects such as glyphs often include portions that are perceivable as being linear but the portions are not geometrically linear. Conventional systems are not capable of detecting these portions that are perceivable as being linear. This is because conventional systems are limited to detecting geometrically linear portions of vector objects. In order to overcome the limitations of conventional systems, techniques and systems are described for generating indications of perceptual linear regions of vector objects.

In one example, a computing device implements a linear region system to receive input data describing an outline of a vector object. For example, the vector object is a glyph of a font. The linear region system projects linear approximation lines through consecutive points of the outline. Differences between the consecutive points and the linear approximation lines are computed as distances between the consecutive points and the linear approximation lines.

The linear region system compares a sum of these differences for a particular pair of consecutive points of the outline to a first error threshold. If this sum is less than the first error threshold, then the linear region system generates a linear segment connecting the particular pair of consecutive points. The linear region system repeats this process for all pairs of consecutive points of the outline to generate linear segments. After generating the linear segments, the linear region system combines sequential linear segments into linear groups.

The linear region system groups the sequential linear segments into the linear groups by projecting linear approximation lines through sequential points included in the sequential linear segments. Differences between the sequential points and the linear approximation lines are determined and the linear region system groups the sequential linear segments into the linear groups based on the differences. For example, a sum of differences between sequential points included in a particular linear group and a linear approximation line projected through the points is less than a second error threshold. Before adding an additional sequential segment including an additional sequential point to the particular linear group, the linear region system projects an additional linear approximation line through the points included in the particular linear group and the additional point.

The linear region system determines differences between the sequential points including the additional sequential point and the additional linear approximation line. A sum of these determined differences is compared to the second error threshold. If the sum is greater than the second error threshold, then the additional linear segment having the additional sequential point is not included in the particular linear group.

If the sum is not greater than the second error threshold, then the linear region system determines whether an angle between the additional sequential linear segment including the additional sequential point and a coordinate axis is within an angular tolerance of an average angle between linear segments connecting the sequential points included in the particular linear group and the coordinate axis. If the linear region system determines that the angle between the additional sequential linear segment including the additional sequential point and the coordinate axis is not within the angular tolerance, then the additional sequential linear segment having the additional sequential point is not included in the particular linear group. If the angle between the additional sequential linear segment including the additional sequential point and the coordinate axis is within the angular tolerance, then the linear region system adds the additional sequential linear segment and the additional sequential point to the particular linear group.

If the additional sequential point is not included in the particular linear group, then the linear region system attempts to include the additional sequential linear segment having the additional sequential point in an additional linear group in a similar manner. The linear region system continues this process until each of the sequential points is determined to be included in a linear group or is determined not to be includable in a linear group. For example, the linear region system then removes linear segments which are less than a threshold length to prevent clutter.

In one example, the linear region system combines a first linear group and a second linear group of the linear groups into a combined group based on a linearity constraint. This linearity constraint ensures that a length of the combined group does not exceed a threshold length. The constraint also ensures that the first linear group and the second linear group are not overlapping or separated by a Euclidean distance which is greater than a threshold distance. For example, the linearity constraint ensures that the combination of the first linear group and the second linear group minimizes a projection error. In other examples, the linearity constraint is a determination that the first linear group and the second linear group are nearly parallel and/or nearly collinear.

An indication of a perceptual linear region of the vector object is generated for display in a user interface based on the combined group. For example, the linear region system generates an augmented vector object that includes the indication of the perceptual linear region. In this example, the indication is a snap guide usable to precisely align the vector object with another vector object.

By generating the indication of the perceptual linear region as a snap guide, the described systems improve vector object alignment technology relative to conventional systems which are not capable of detecting the perceptual linear region. Unlike conventional systems, the described systems are capable of generating and displaying multiple indications of perceptual linear regions of glyphs or any vector object. By generating the indications of perceptual linear regions as snap guides for glyphs of a font, the glyphs are precisely aligned as editable text. For example, the glyphs are live text before and after alignment of the glyphs via the snap guides which is also not possible using conventional systems.

Term Examples

As used herein, the term "a linear approximation line" refers to an approximated line computed using a linear solver based on a sequence of points. By way of example, the sequence of points is not geometrically linear and the approximated line approximates a linear relationship for the sequence of points.

As used herein, the term "linear segment" refers to a connection between two consecutive points of a line or a linear approximation of a connection between two consecutive points of a curve.

As used herein, the term "a linear group" refers to a set of at least one linear segment of an outline of a vector object. By way of example, a linear group includes multiple sequential linear segments.

As used herein, the term "a combined group" refers to a combination of a first linear group and a second linear group. By way of example, the first linear group and the second linear group are sequential or non-sequential.

As used herein, the term "a perceptual linear region" refers to a portion of a vector object that is visually perceivable as being linear but the portion is not geometrically linear.

As used herein, the term "snap guide" refers to a region defined in a user interface which relocates a cursor or a portion of a digital object that is within a threshold proximity of the region to collocate the cursor or the portion of the digital object with the region.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a linear region module 110. The storage device 108 is illustrated to include digital content 112 such as font files, vector objects, raster objects, digital images, digital videos, and so forth.

The linear region module 110 is illustrated as having, receiving, and/or transmitting input data 114. This input data 114 describes vector objects and outlines of the vector objects. In the illustrated example, the input data 114 describes a glyph 116 of a font which is an uppercase "M." For example, the input data 114 includes a font file of the font.

The glyph 116 appears to include several linear regions; however, an outline 118 of the glyph 116 which is displayed in a user interface 120 of the display device 106 includes multiple points within these apparent linear regions. For example, a portion 122 of the glyph 116 corresponding to a portion of the outline 118 between point 124 and point 128 appears to be a linear region when visually perceiving the glyph 116, but there are multiple points between the points 124, 126 in the outline 118 including points 128, 130 which are sequential points of the outline 118. Accordingly, the portion 122 of the glyph 116 is not geometrically linear. As a result of this, it is not possible to snap to the portion 122 of the glyph 116 using conventional systems which are only capable of snapping to geometrically linear portions of the glyph 116.

In order to overcome the limitations of the conventional systems, the linear region module 110 processes the input data 114 and identifies linear segments as connections between two consecutive points of lines of the outline 118. For consecutive points of a curve of the outline 118, the linear region module 110 projects a linear approximation line through the consecutive points and determines differences between the points and the linear approximation line. If a sum of these differences is less than a first error threshold, then the linear region module 110 generates a linear segment between the consecutive points of the curve of the outline 118 based on the linear approximation line.

After identifying and/or generating the linear segments of consecutive points of the outline 118, the linear region module 110 combines sequential linear segments into a linear group. To do so in one example, the linear region module 110 determines differences between sequential points of the sequential linear segments of the outline 118 and linear approximation lines projected through the sequential points. For example, the linear region module 110 groups the sequential linear segments of the outline 118 into linear groups based on the differences.

In this example, the linear region module 110 ensures that a sum of differences between sequential points of linear segments of a particular linear group and a linear approximation line projected through the sequential points is less than a second error threshold. In one example, the first error threshold (e.g., for determining linear segments) is the same as the second error threshold (e.g., for determining linear groups). In another example, the first error threshold is not the same as the second error threshold.

Consider an example in which the particular linear group includes a linear segment connecting points 124, 128 and the linear region module 110 determines whether to include a linear segment connecting points 128, 130 in the particular linear group or in a different linear group. To do so, the linear region module 110 projects a linear approximation line through the points 124, 128, 130 and sums differences between each of the points 124, 128, 130 and the linear approximation line. If this sum is greater than the second error threshold, then the linear region module 110 includes the linear segment connecting the points 128, 130 in the different linear group.

If the sum is not greater than the error threshold, then the linear region module 110 determines whether an angle between the linear segment of the outline 118 connecting the point 128 and the point 130 and a coordinate axis is within an angular tolerance of an average angle of linear segments connecting sequential points included in the particular linear group with respect to the coordinate axis. If the angle between the linear segment connecting the points 128, 130 and the coordinate axis is within the angular tolerance, then the linear region module 110 adds the linear segment connecting the points 128, 130 to the particular linear group and updates the average angle. If the angle between the linear segment connecting the points 128, 130 and the coordinate axis is not within the angular tolerance, then the linear region module 110 includes the segment connecting the points 128, 130 in the different linear group.

Figure 2:
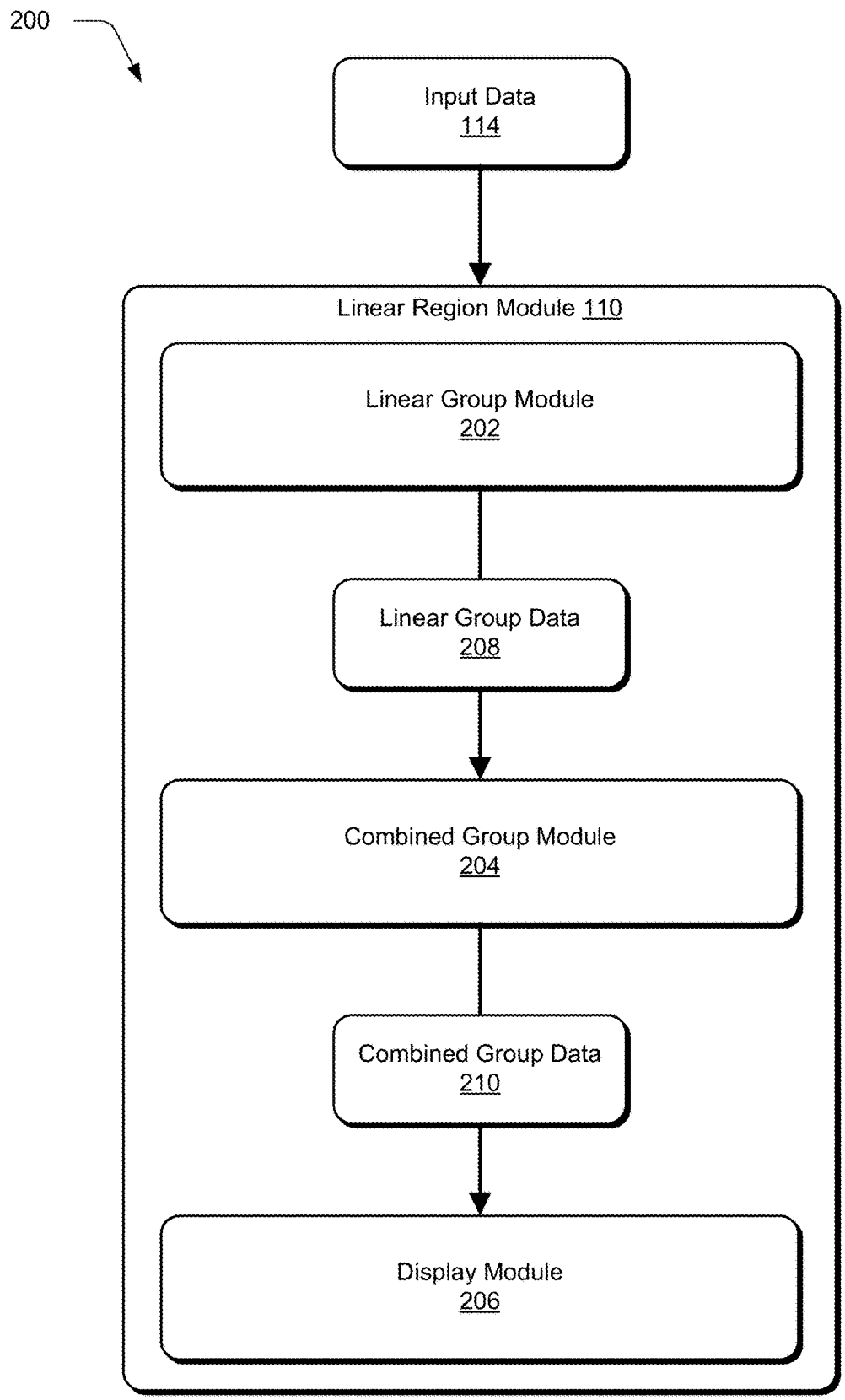
FIG. 2 depicts a system in an example implementation showing operation of a linear region module for generating indications of perceptual linear regions of vector objects.

After grouping sequential linear segments of the outline 118 into the linear groups in this manner, the linear region module 110 compares the linear groups and merges or combines the linear groups based on the comparing which is described in detail with respect to FIGS. 2-4. In one example, the linear region module 110 combines a first linear group and a second linear group of the linear groups into a combined group based on a linearity constraint. For example, the linearity constraint ensures that the first linear group and the second linear group are not overlapping, are nearly collinear, are nearly parallel, represent a combination that minimizes a projection error, etc. The linear region module 110 then generates an augmented glyph 132 which is displayed in the user interface 120. As shown, the augmented glyph 132 includes an indication 134 of a perceptual linear region of the glyph 116. In this example, the linear region module 110 generates the indication 134 based on the combined group.

In the illustrated example, the indication 134 is a snap guide that relocates a cursor or a portion of a digital object that is within a threshold proximity of the portion 122 of the glyph 116 to collocate the cursor or the portion of the digital object with the portion 122 of the glyph 116 in the user interface 120. In this example, the indication 134 is usable for precisely aligning the portion 122 with the portion of the digital object and/or a portion of another glyph. By leveraging the indication 134 in this manner, the portion 122 is aligned with the portion of the digital object while the glyph 116 is live text. For example, the glyph 116 is editable as text before and after aligning the portion 122 with the portion of the digital object. This is not possible in conventional systems which are not capable of snapping to the portion 122 of the glyph 116 because the portion 122 is not geometrically linear.

FIG. 2 depicts a system 200 in an example implementation showing operation of a linear region module 110. The linear region module 110 is illustrated to include a linear group module 202, a combined group module 204, and a display module 206. As shown, the linear region module 110 receives the input data 114 describing vector objects and outlines of the vector objects as an input. In some examples, these vector objects are glyphs of fonts such as the glyph 116. In one example, the linear group module 202 receives the input data 114 and processes the input data 114 to generate linear group data 208.

Figure 3B:
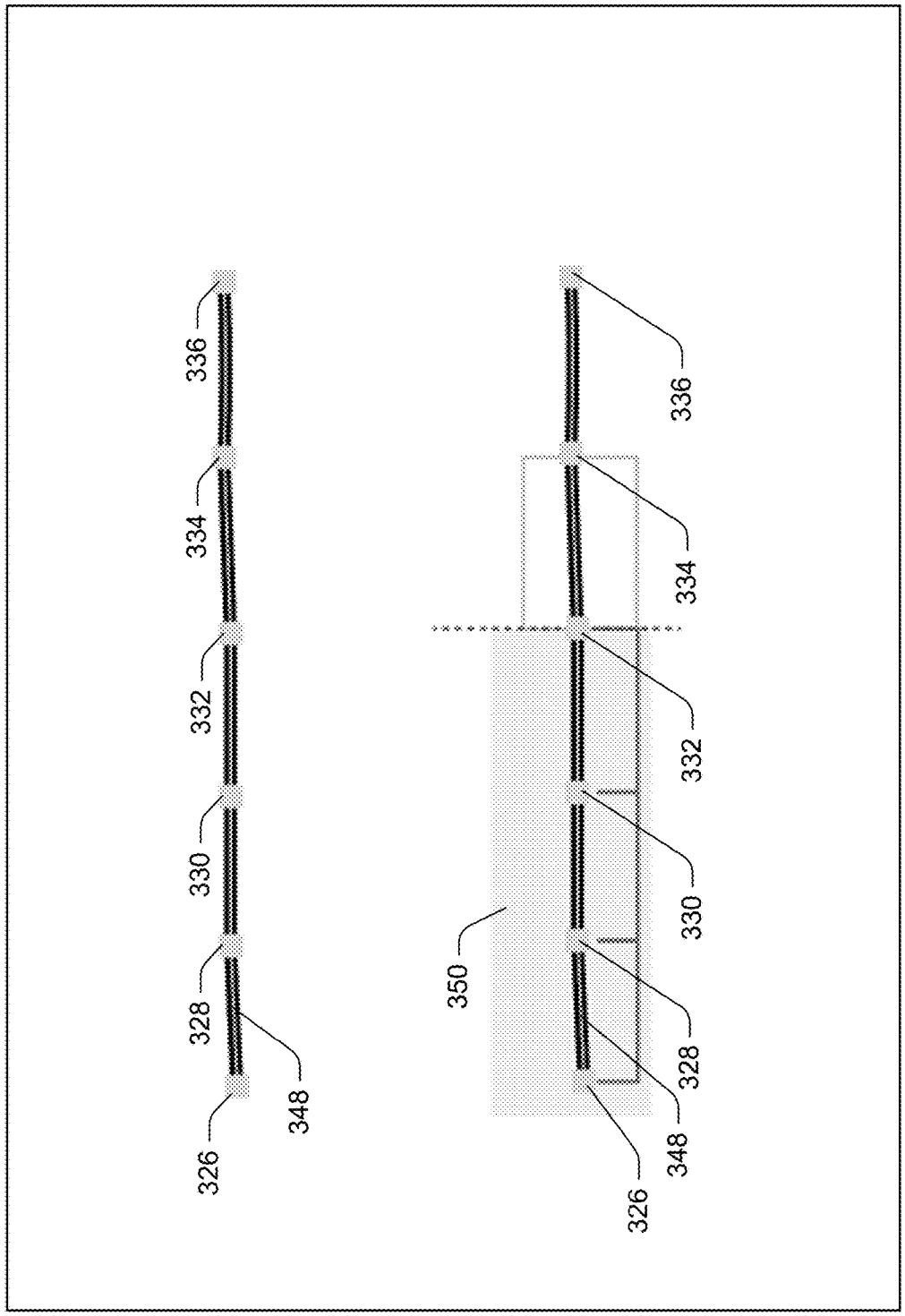
Figure 3C:
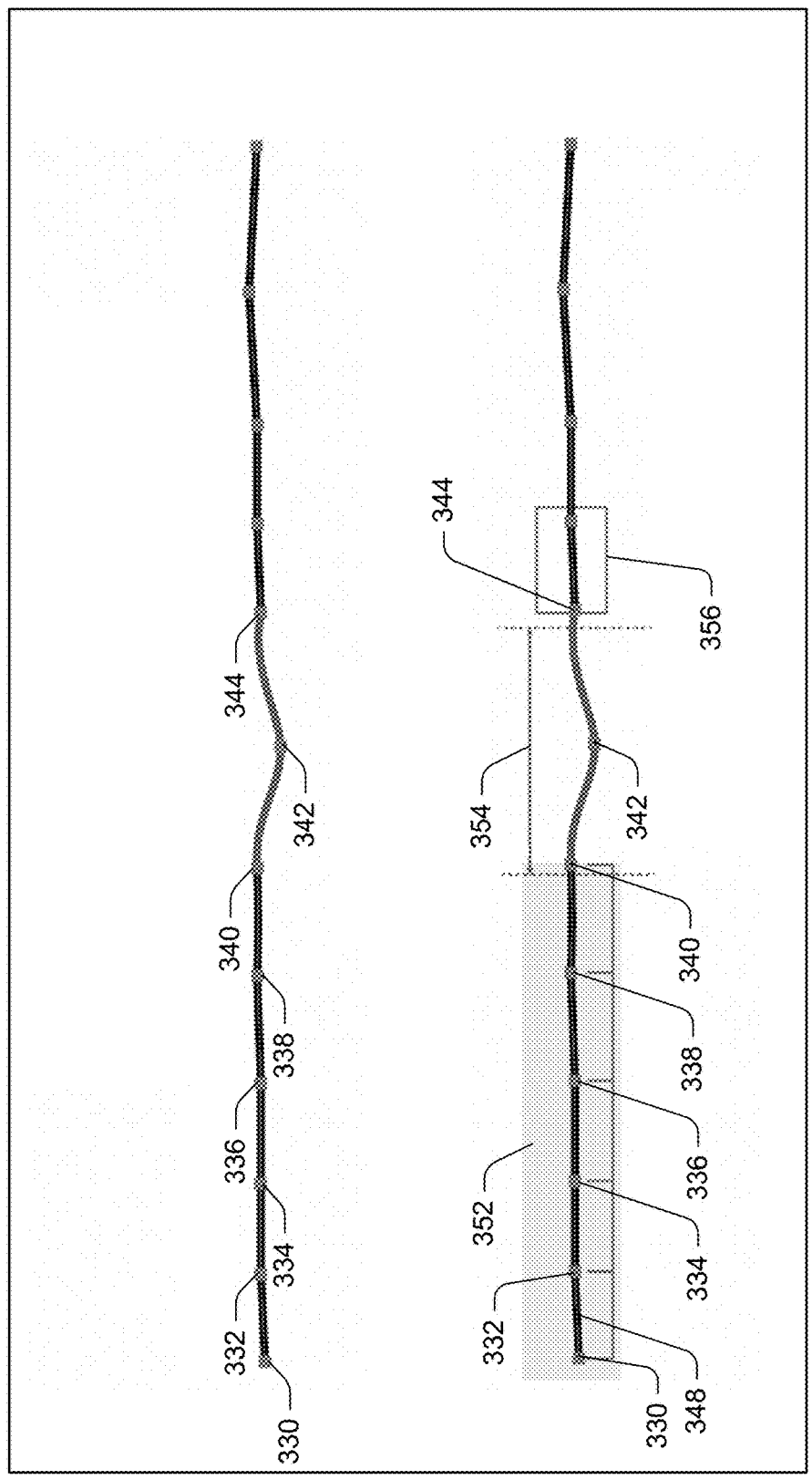
Figure 3D:
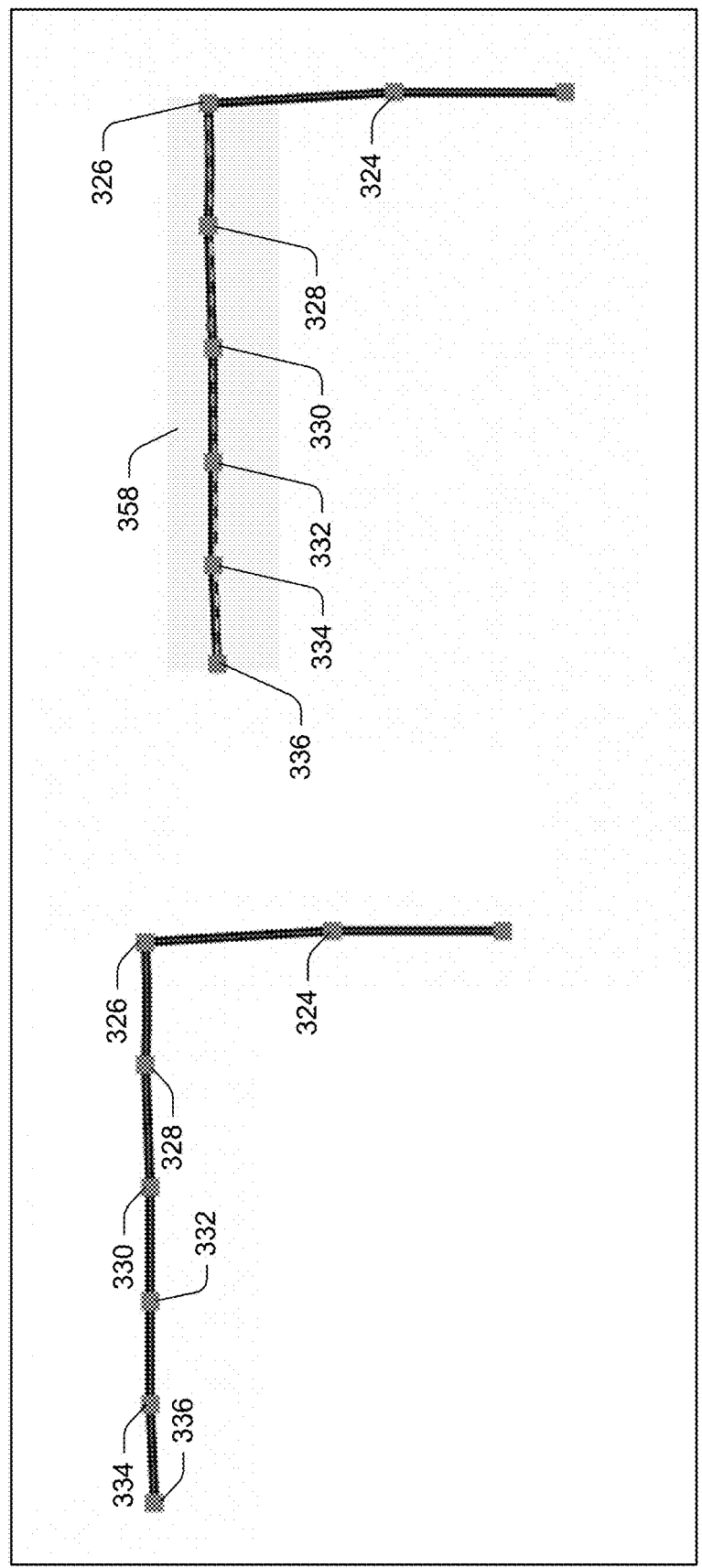
Figure 3E:
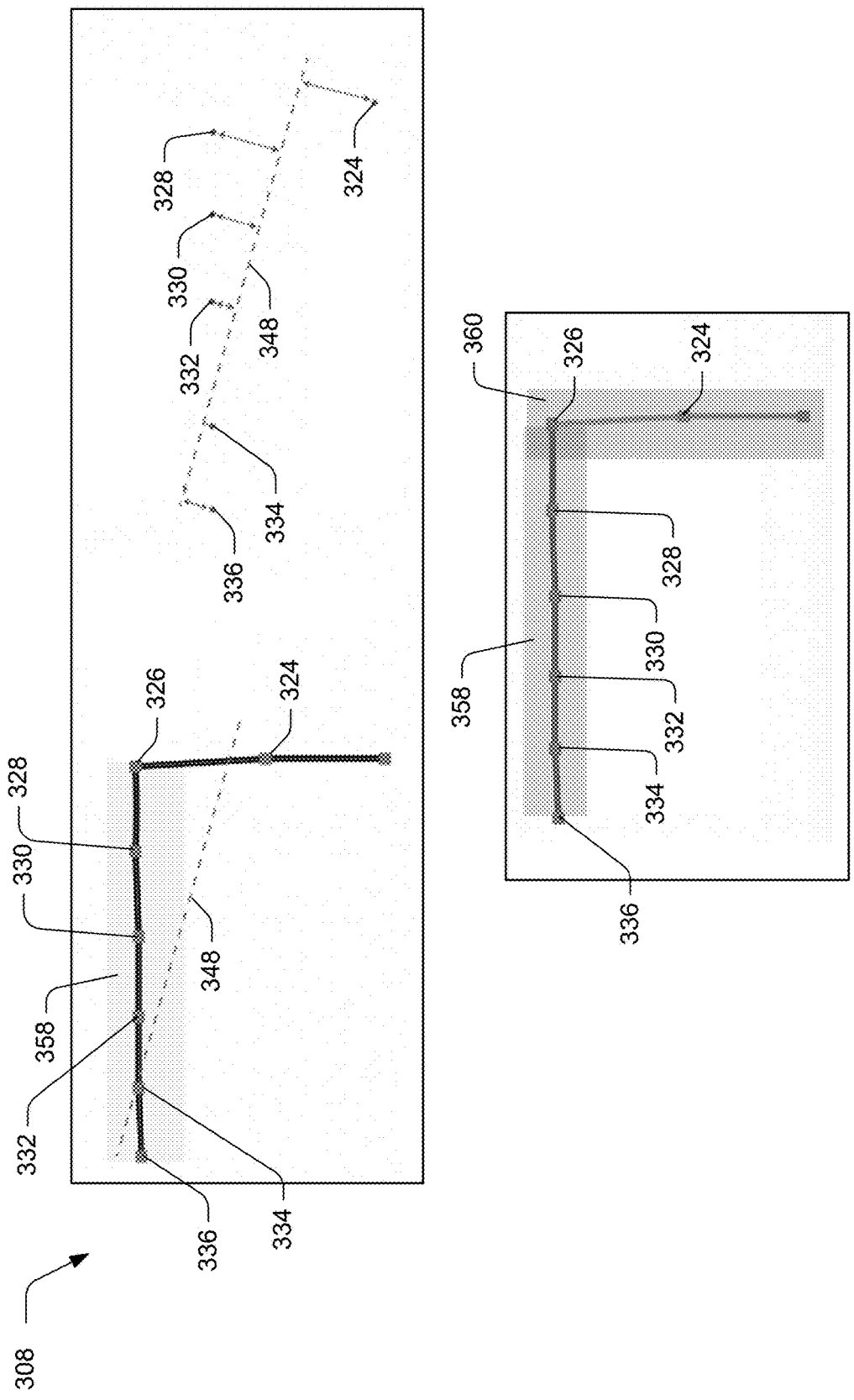
Figure 37:
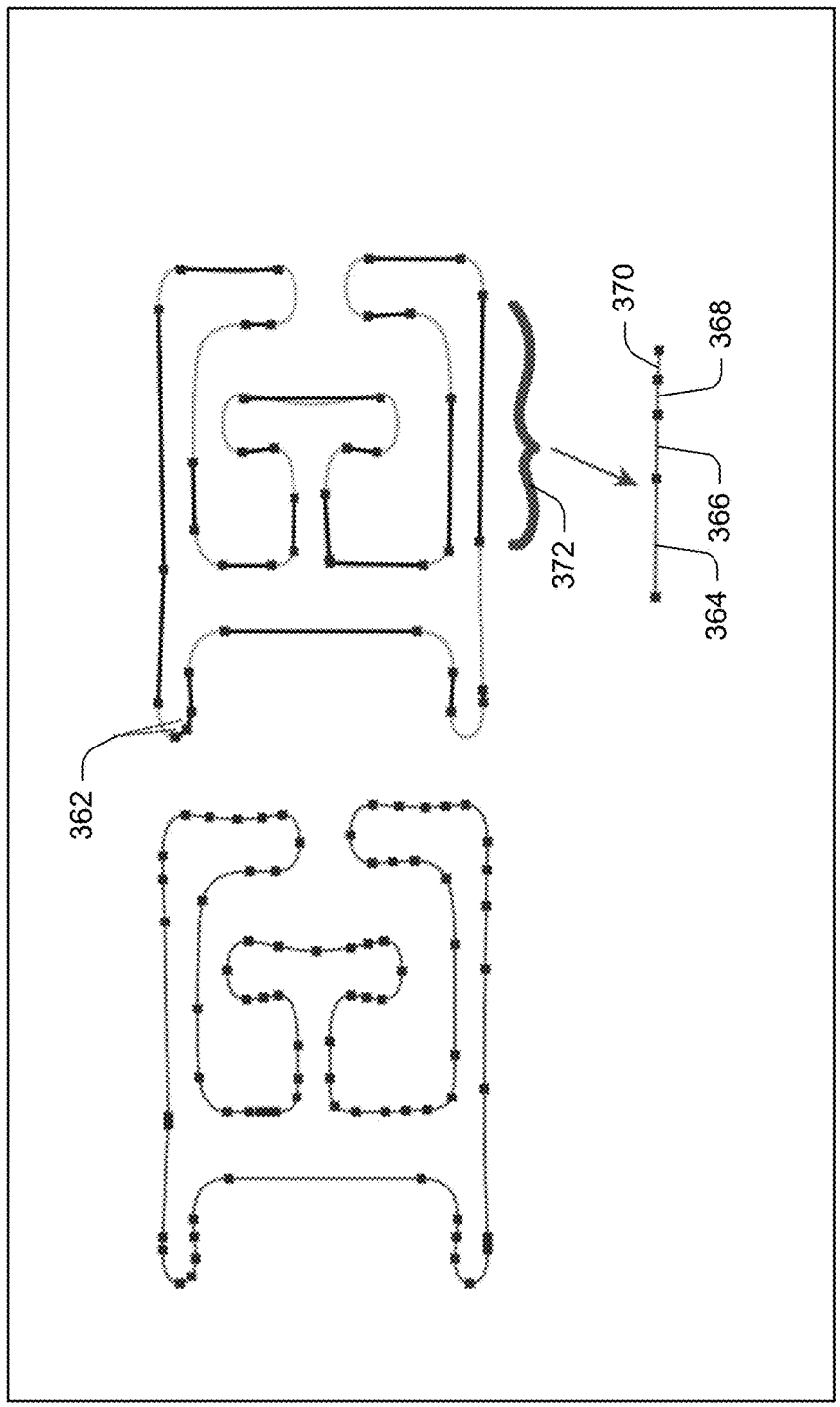
Figure 3G:
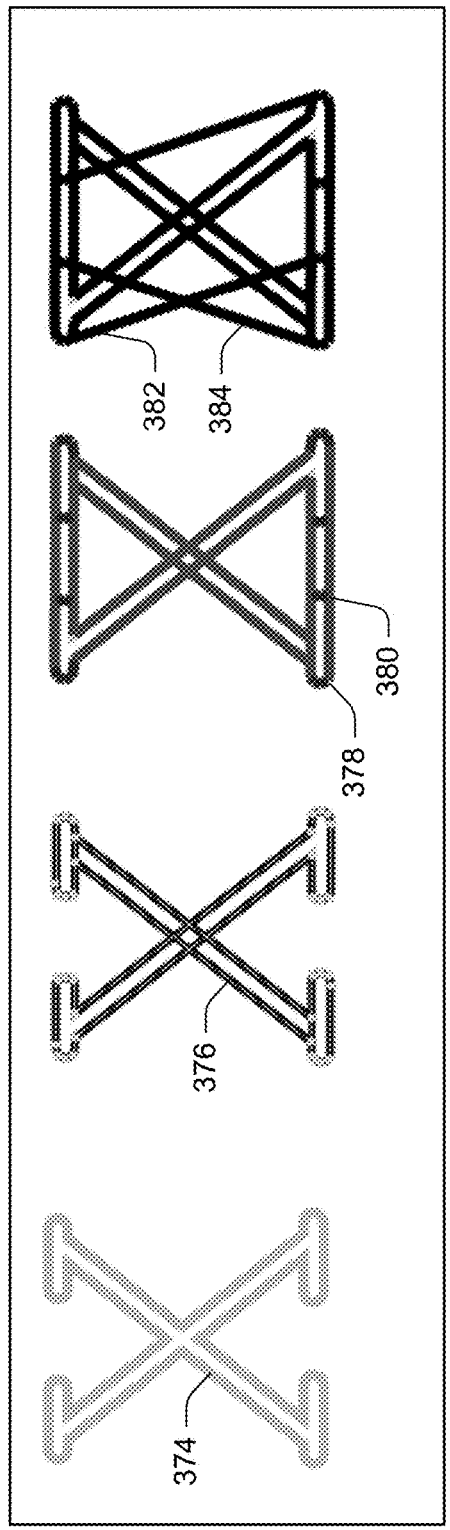
Figure 37A:
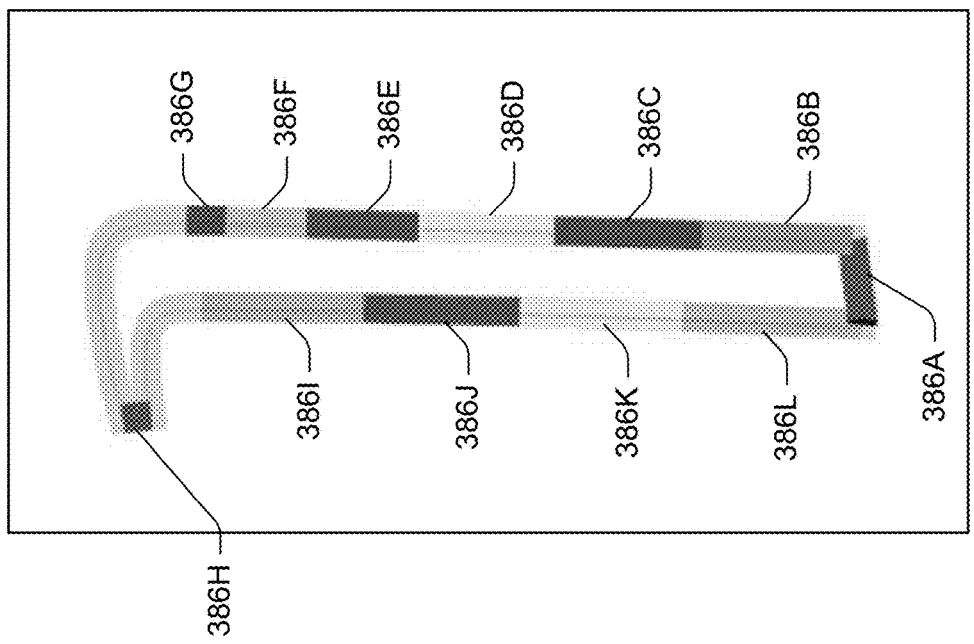
Figure 39:
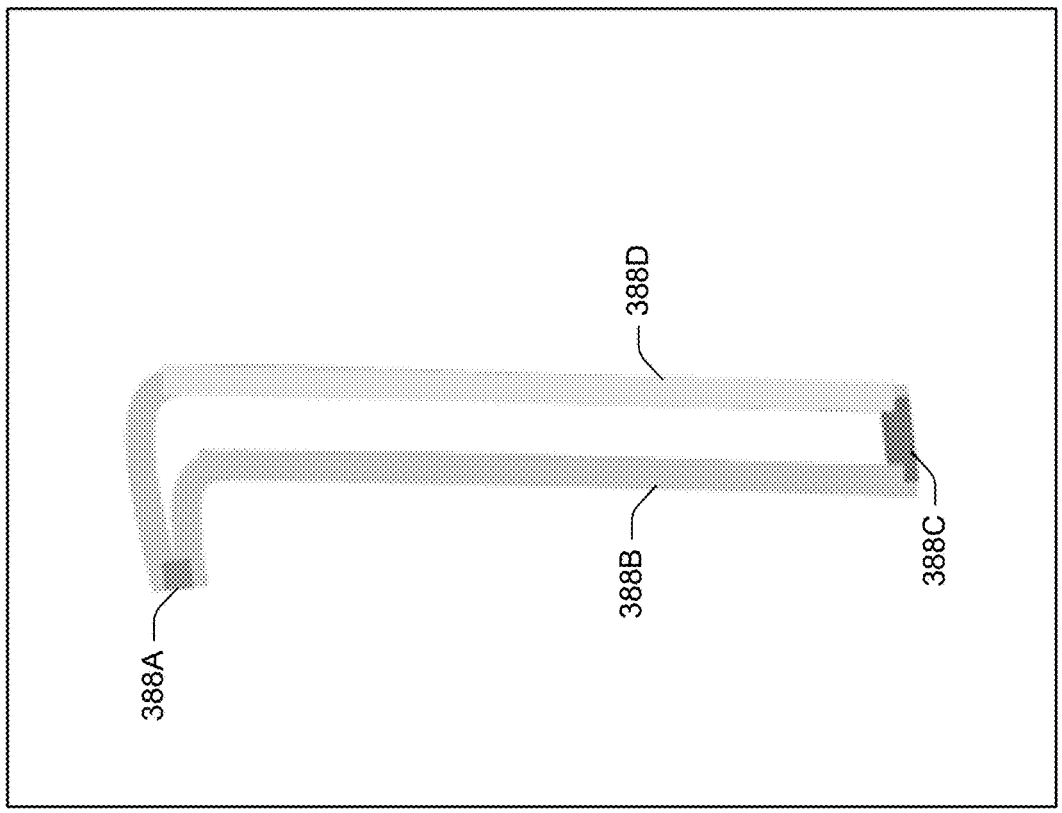

FIGS. 3A, 3B, 3C, 3D, 3E, 3F, 3G, 3H, and 3I illustrate an example of grouping sequential points of an outline of a vector object into linear groups. FIG. 3A illustrates a representation 300 of a vector object and an outline of the vector object described by the input data 114. FIG. 3B illustrates a representation 302 of including a sequential linear segment in a linear group. FIG. 3C illustrates a representation 304 of including a non-sequential linear segment in a different linear group. FIG. 3D illustrates a representation 306 of determining whether to include a sequential linear segment in a linear group or a different linear group. FIG. 3E illustrates a representation 308 of determining differences between sequential points and a linear approximation line projected through the sequential points. FIG. 3F illustrates a representation 310 of combining sequential linear segments and removing short linear segments to prevent cluttering. FIG. 3G illustrates a representation 312 of cluttering caused if short linear segments are not removed. FIG. 3H illustrates a representation 314 of linear segments. FIG. 3I illustrates a representation 316 of linear groups described by the linear group data 208.

With respect to FIGS. 2 and 3A, the linear group module 202 receives the input data 114 which describes a glyph 318 of a font. The glyph 318 includes a portion 320 that appears to be a linear region when visually perceiving the glyph 318. As shown, the representation 300 includes an outline 322 of the glyph 318 and a portion of the outline 322 that corresponds to the portion 320 includes multiple sequential points. The outline 322 of the glyph 318 is illustrated to include points 324-346. Since a portion of the outline 322 corresponding to the portion 320 of the glyph 318 includes multiples one of the points 324-346, the portion 320 is not geometrically linear.

The linear group module 202 processes the input data 114 which describes the outline 322 to group the points 324-346 into linear groups. The linear group module 202 first identifies linear segments connecting consecutive pairs of the points 324-346. For consecutive pairs of the points 324-346 connected by a curve such as points 342, 340, the linear group module 202 projects a linear approximation line through the points 342, 340 and determines a difference between the point 342 and the linear approximation line. The linear group module 202 computes a sum of this difference and a difference between the point 340 and the linear approximation line. If this sum is less than a first error threshold, then the linear group module 202 generates a linear segment for the points 342, 340 based on the linear approximation line.

As shown in FIG. 3B, the representation 302 includes a portion of the outline 322 defined by points 326-336 and the linear group module 202 projects a linear approximation line 348 through the points 326-336. In the illustrated example, linear segments connecting points 326, 328; points 328, 330; and points 330, 332 are included in a linear group 350 and the linear group module 202 processes the input data 114 to determine whether to include a linear segment connecting points 332, 334 in the linear group 350 or a different linear group.

To do so in one example, the linear group module 202 projects the linear approximation line 348 through the points 326-334 determines a difference (e.g., a distance) between the point 326 and the linear approximation line 348, a difference between the point 328 and the linear approximation line 348, a difference between the point 330 and the linear approximation line 348, a difference between the point 332 and the linear approximation line 348, and a difference between the point 334 and the linear approximation line 348. The linear group module 202 sums these determined differences and compares the sum to a second error threshold. If the sum of the differences between the points 326-334 and the linear approximation line 348 is greater than the second error threshold, then the linear group module 202 includes the linear segment connecting the points 332, 334 in the different linear group. If the sum of the differences between the points 326-334 and the linear approximation line 348 is not greater than the second error threshold, then the linear group module 202 determines an angle between the linear segment of the outline 322 connecting the point 332 and the point 334 and a coordinate axis. In one example, the linear group module 202 determines a slope of the linear segment connecting the points 332, 334 as part of determining the angle between the linear segment and the coordinate axis.

For example, the linear group module 202 determines whether the angle between the linear segment connecting the points 332, 334 and the coordinate axis is within an angular tolerance of an average angle of the linear segments included in the linear group 350. This average angle is computed as an average value of an angle between the linear segment connecting the point 326 and the point 328 and the coordinate axis, an angle between the linear segment connecting the point 328 and the point 330 and the coordinate axis, and an angle between the linear segment connecting the point 328 and the point 330 and the coordinate axis. If the linear group module 202 determines that the angle between the linear segment connecting the points 332, 334 and the coordinate axis is not within the angular tolerance of the average angle of the linear segments include in the linear group 350, then the linear group module 202 includes the linear segment connecting the points 332. 334 in the different linear group.

If the linear group module 202 determines that the angle between the linear segment connecting the points 332, 334 and the coordinate axis is within the angular tolerance of the average angle of linear segments included in the linear group 350, then the linear group module 202 includes the linear segment connecting the points 332, 334 in the linear group 350. In this scenario, the linear group module 202 updates the average angle of the linear group 350 to include the angle between the linear segment connecting the points 332, 334 and the coordinate axis. The updated average angle of the linear group 350 is computed as an average value of the angle between the linear segment connecting the points 326, 328 and the coordinate axis, the angle between the linear segment connecting the points 328, 330 and the coordinate axis, the angle between the linear segment connecting the points 330, 332, and the angle between the linear segment connecting the points 332, 334 and the coordinate axis. In one example, this is representable as:

$$UpdatedAvgAngle = \frac{((AvgAng*(ClusterSize-1))+Angle)}{ClusterSize}$$

where: UpdatedAvgAngle is the updated average angle of the linear group 350; AvgAng is the previous average angle of the linear group 350; ClusterSize is a number of linear segments in the linear group; and Angle is the angle between the linear segment connecting the points 332, 334 and the coordinate axis.

The linear group module 202 then determines whether to include a linear segment connecting the point 334 and point 336 in the linear group 350 or the different linear group by determining differences between the points 326-336 and the linear approximation line 348 and comparing a sum of these determined distances to the second error threshold.

Consider an example in which linear group module 202 processes the input data 114 to group the points 324-346 into linear segments as shown in FIG. 3C. The representation 304 includes a portion of the outline 322 defined by points 330-344 and the linear group module 202 leverages the linear approximation line 348 and the second error threshold to group linear segments connecting points 330, 332; points 332, 334; points 334, 336; points 336, 338; and points 338, 340 into a linear group 352. As shown, the portion of the outline 322 includes a curved segment 354 and the curved segment 354 includes point 342.

The linear group module 202 does not generate a linear segment between the point 340 and the point 342 because a sum of a difference between the point 340 and a linear approximation line projected through the points 340, 342 and the point 342 and the linear approximation line is greater than the first error threshold. Similarly, the linear group module 202 does not generate a linear segment between the point 342 and point 344 because a sum or a difference between the point 342 and a linear approximation line projected through the points 342, 344 and a difference between the point 344 and the linear approximation line is greater than the first error threshold. Because the linear group module 202 does not generate the linear segment between the points 340, 342, there are no additional sequential linear segments to include in the linear group 352. Accordingly, the linear group module 202 includes a linear segment connecting the point 344 and point 346 in a new linear group 356. The linear group module 202 then identifies whether any additional linear segments are included in the new linear group 356.

Consider an example in which the linear group module 202 groups points of the outline 322 into sequential linear groups as illustrated in FIGS. 3D and 3E. The representation 306 includes a portion of the outline 322 defined by points 336, 334, 332, 330, 328, 326, and 324. As shown, the linear group module 202 has included sequential linear segments connecting points 336, 334; points 334, 332; points 332, 330; points 330, 328; and points 328, 326 in a linear group 358. For example, the linear group module 202 determines whether to include a linear segment connecting points 326, 324 in the linear group 358 or a different linear group. To do so, the linear group module 202 projects the linear projection line 348 through the points 336, 334, 332, 330, 328, 326, and 324 which is illustrated in the representation 308.

The linear group module 202 determines a difference between the point 336 and the linear projection line 348, a difference between the point 334 and the linear projection line 348, a difference between the point 332 and the linear projection line 348, a difference between the point 330 and the linear projection line 348, a difference between the point 328 and the linear projection line 348, a difference between the point 326 and the linear projection line 348, and a difference between the point 324 and the linear projection line 348. The linear group module 202 sums the determined differences and compares the sum to the second error threshold.

As shown, the sum of the differences between the points 336-324 and the linear projection line 348 is greater than the second error threshold and the linear group module 202 does not include the linear segment connecting the points 326, 324 in the linear group 358. Rather, the linear group module 202 groups the linear segment connecting the points 326, 324 into an additional linear group 360. In this example, because the point 324 is not collinear with the points 336-326, the linear segment connecting the points 326, 324 causes the sum of the differences between the points 336-324 and the linear projection line 348 to be greater than the second error threshold. As a result of this, the linear group module 202 includes the linear segment connecting the points 326, 324 in the additional linear group 360.

After grouping the linear segment connecting the points 326, 324 in the additional linear group 360, the linear group module 202 combines sequential linear segments and removes short linear segments to prevent cluttering. Consider an example of removing short linear segments and combining sequential linear segments as shown in FIG. 3F. In this example, the representation 310 includes an outline of a glyph and the linear group module 202 identifies linear segments as connections between two consecutive points of lines of the outline. The linear group module 202 generates linear segments between consecutive points of curves of the outline if a sum of differences between the consecutive points and a linear approximation line projected through the consecutive points is less than the first error threshold. The linear group module 202 then removes linear segments determined to be short linear segments. As shown, the linear group module 202 removes short linear segments 362 to prevent cluttering illustrated with reference to FIG. 3G.

For example, the linear group module 202 identifies the short linear segments 362 as having distances between sequential points included in the short linear segments 362 that are less than a threshold distance. The linear group module 202 also combines sequential linear segments such as linear segments 364-370. In the illustrated example, the linear segment 364 and the linear segment 366 are consecutive linear segments before combination. For example, the linear group module 202 combines the four sequential linear segments 364-370 into linear group 372 which is a single linear group. In this example, points of the outline which were previously included in one of the sequential linear segments 364-370 are included in the linear group 372 after this combination.

As shown in FIG. 3G, the representation 312 includes a glyph 374 which is the letter "X" and an outline 376 of the glyph 374 with linear segments depicted in black. The outline 376 does not include linear segments for consecutive points which have differences from linear approximations lines projected through the consecutive points such that a sum of the differences is greater than the first error threshold. The linear group module 202 identifies short linear segments 378, 380. The linear group module 202 removes the short linear segments 378, 380 to prevent clutter 382, 384. For example, if the linear group module 202 does not remove the short linear segment 378, then the short linear segment 378 will be grouped into a short linear group which will be combined with another linear group to create the clutter 384. Similarly, if the linear group module 202 does not remove the short linear segment 378, then the short linear segment 378 will be grouped into another short linear group which is combined with another linear group to create the clutter 382.

The representation 314 of FIG. 3H illustrates 12 linear segments 386A-386L. The outline 322 includes 25 points and the linear group module 202 attempts to generate a linear segment between each pair of consecutive ones of the 25 points. Consecutive points of curve segments are removed if sums of differences between the consecutive points and a linear approximation line projected through the consecutive points exceeds the first error threshold. The linear group module 202 combines sequential ones of the 12 linear segments 386A-386L as shown in FIG. 3I.

As shown, the representation 316 includes four linear groups 388A-388D. Linear segment 386H does not have any sequential linear segments. Accordingly, linear group 388A includes the linear segment 386H. Linear segments 386I-386L are sequential linear segments and the linear group module 202 combines the sequential linear segments 386I-386L as linear group 388B. Similarly, linear group 388C includes linear segment 386A and sequential linear segments 386B-386G are combined as linear group 388D. The linear group module 202 generates the linear group data 208 as describing the representation 316. With reference to FIG. 2, the combined group module 204 receives the linear group data 208 and processes the linear group data 208 to generate combined group data 210.

Figure 4C:
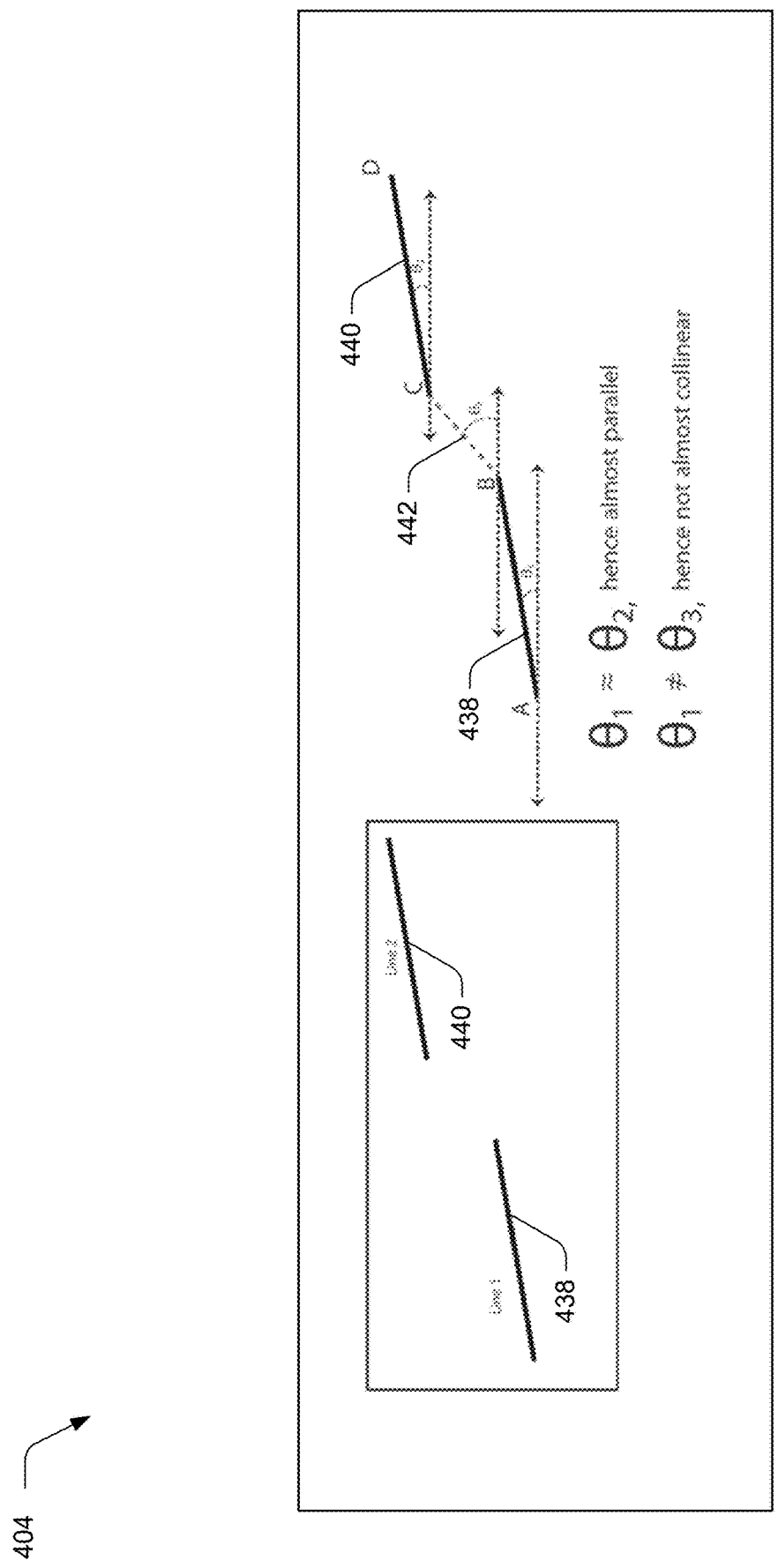
Figure 4D:
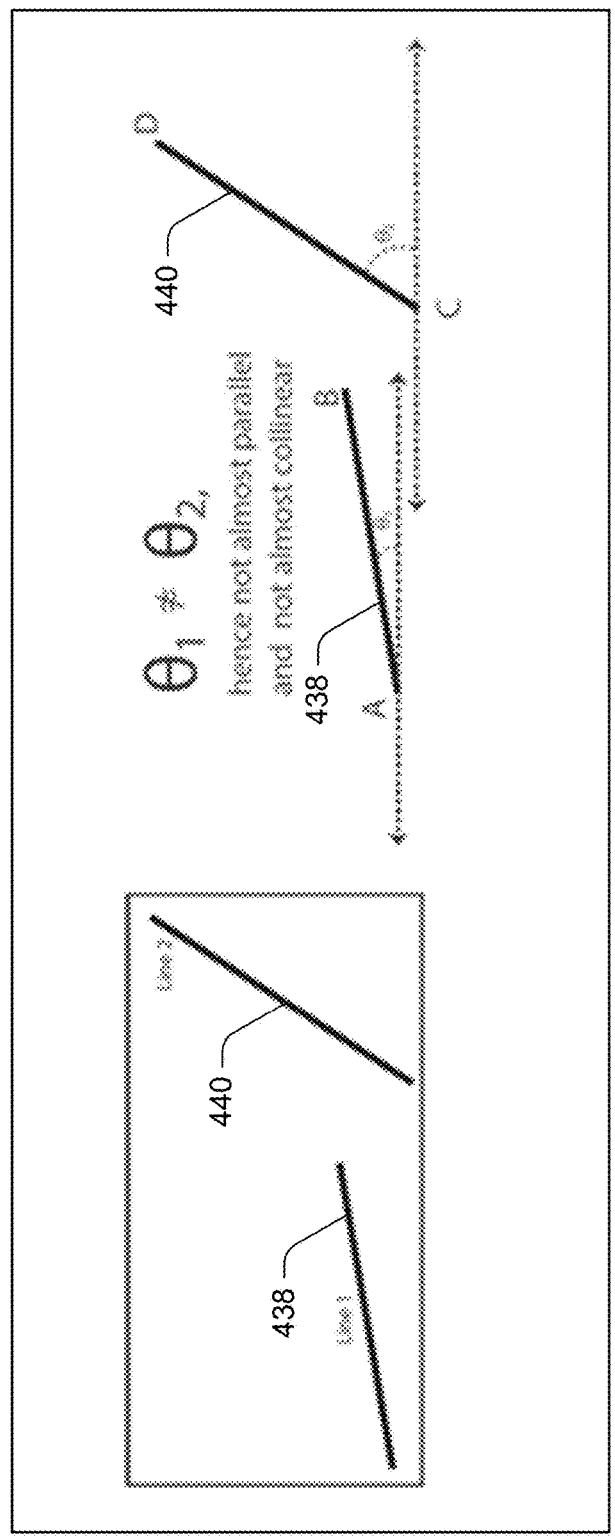
Figure 4E:
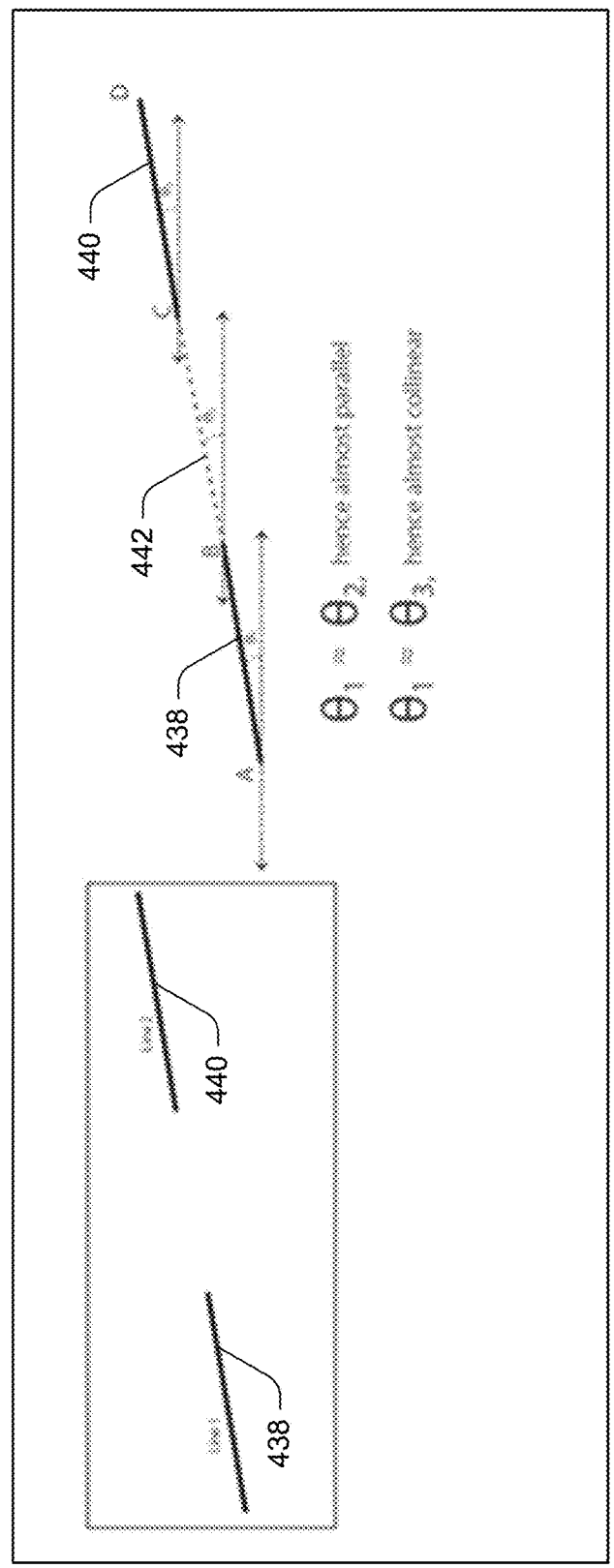
Figure 47:
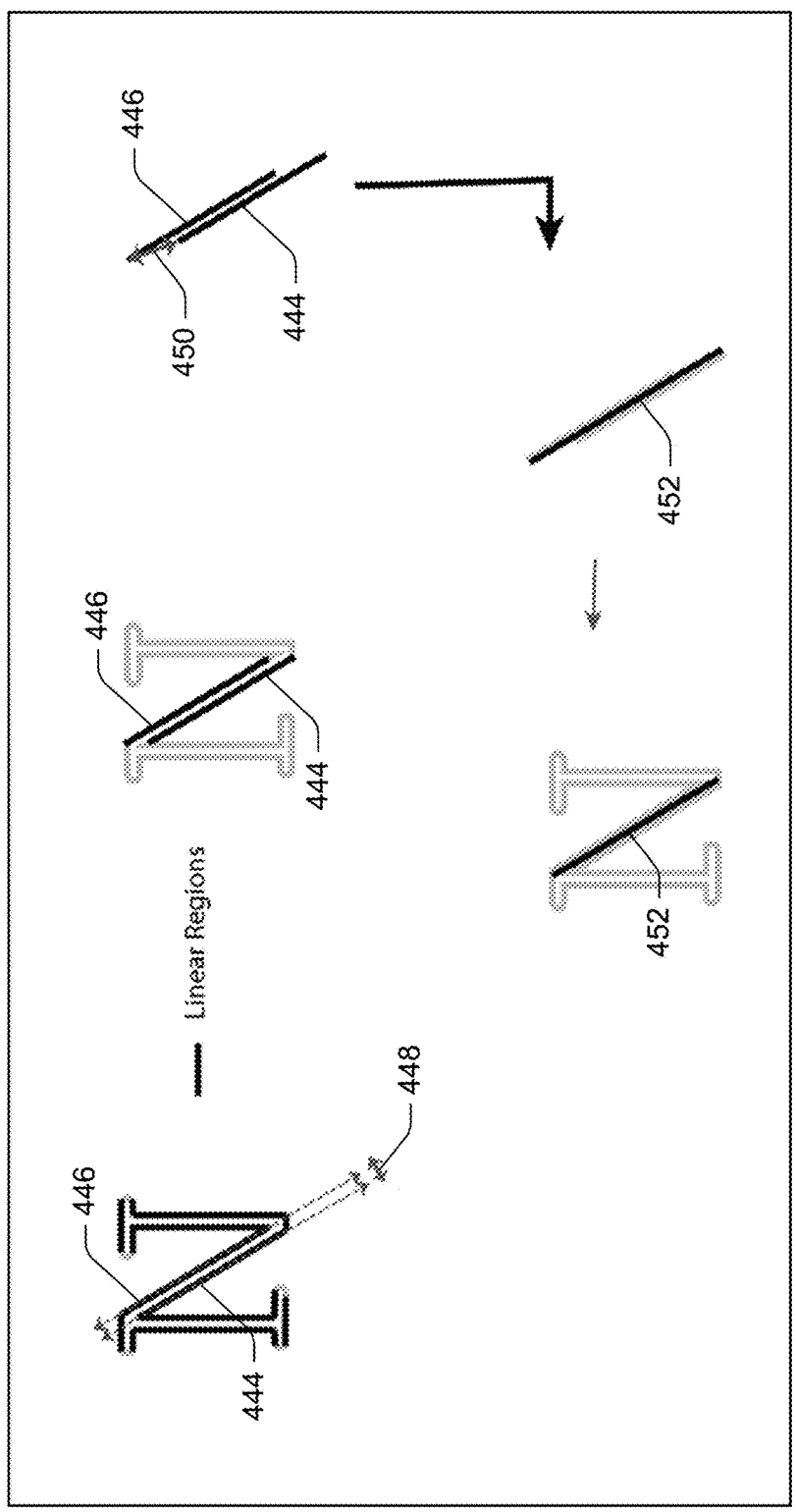
Figure 47A:
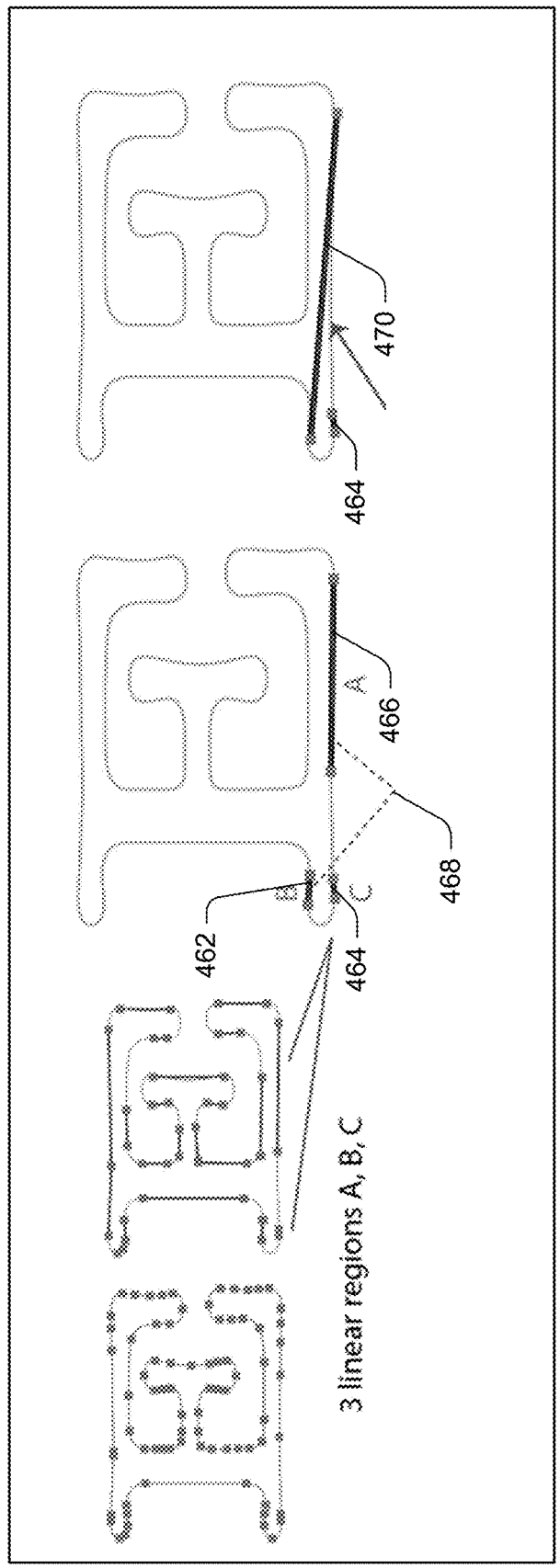
Figure 49:
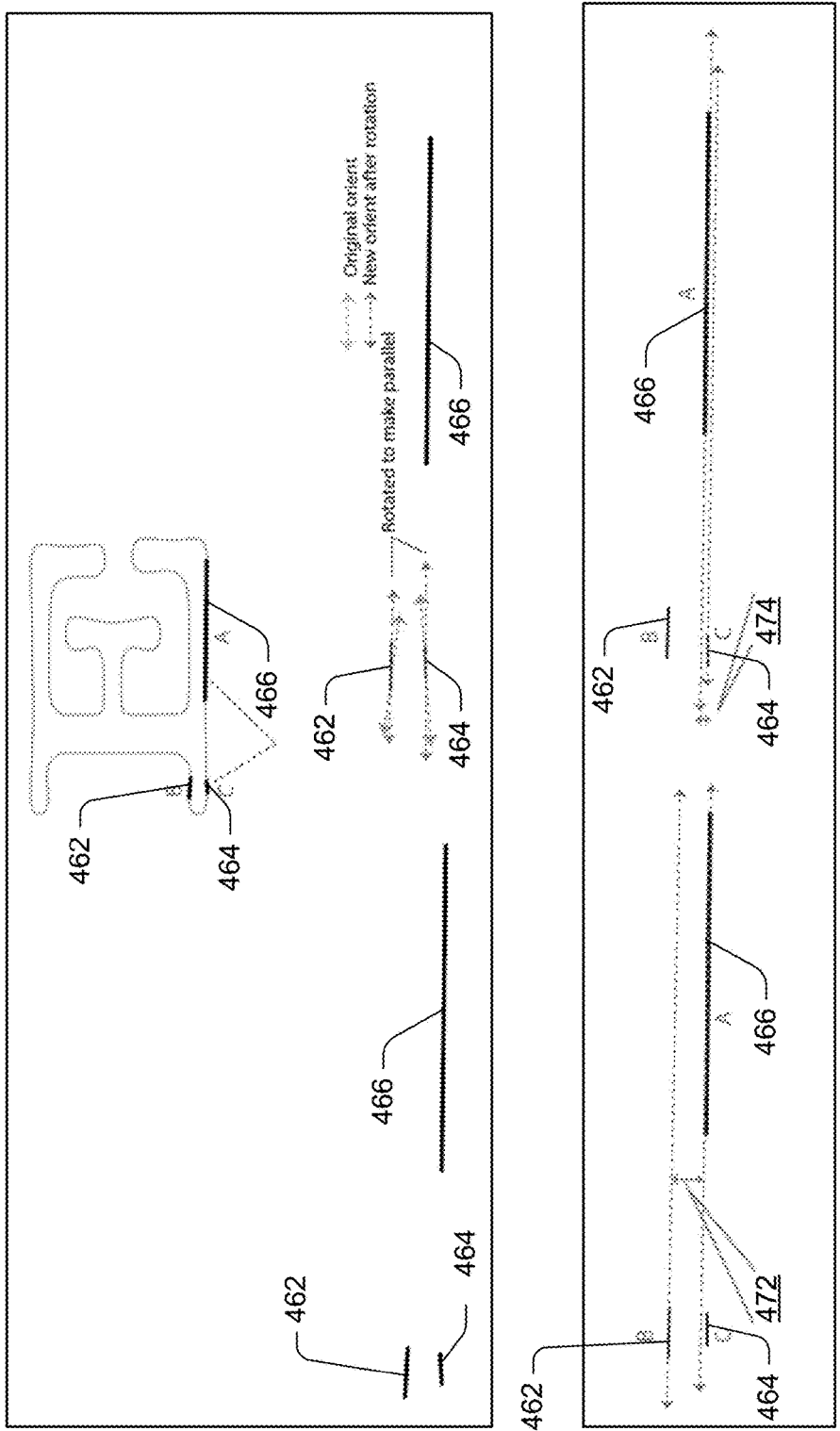

FIGS. 4A, 4B, 4C, 4D, 4E, 4F, 4G, 4H, and 4I illustrate examples of combining linear groups into combined groups for generating indications of perceptual linear regions of vector objects. FIG. 4A illustrates a representation 400 of identifying linear groups that have slopes which are similar to slopes of other linear groups. FIG. 4B illustrates a representation 402 of linear groups included in parallel groups. FIG. 4C illustrates a representation 404 of nearly parallel linear groups. FIG. 4D illustrates a representation 406 of linear groups which are not nearly parallel and not nearly collinear. FIG. 4E illustrates a representation 408 of linear groups which are nearly parallel and are nearly collinear. FIG. 4F illustrates a representation 410 of overlapping linear groups. FIG. 4G illustrates a representation 412 of linear groups which are overlapping and linear groups which should not be combined based on a Euclidean distance between the linear groups. FIG. 4H illustrates a representation 414 of three linear groups. FIG. 4I illustrates a representation 416 of determining a projection error to combine two of the three linear groups.

The combined group module 204 processes the linear group data 208 to identify linear groups for combining as combined groups. To do so in one example, the combined group module 204 organizes the linear groups into groups based on slopes of the linear groups or angles between the linear groups and a coordinate axis. As shown in FIG. 4A, the representation includes distinct linear group 418 and distinct linear group 420. The distinct linear group 418 and the distinct linear group 420 have slightly different slopes but the combined group module 204 determines that this difference is within a tolerance for including the distinct linear groups 418, 420 in a first parallel group. Accordingly, the combined group module 204 includes the distinct linear groups 418, 420 in the first parallel group which includes additional distinct linear groups as well.

The representation 400 also includes distinct linear group 422 and distinct linear group 424. Although the distinct linear group 422 has a slightly different slope than the distinct linear group 424, the combined group module 202 includes the distinct linear groups 422, 424 in a second parallel group. For example, the second parallel group includes additional distinct linear groups which also have slopes similar to slopes of the distinct linear groups 422, 424.

In some examples, the distinct linear groups included in the first parallel group and the distinct linear groups included in the second parallel group are further sorted within the first parallel group and within the second parallel group based on signed distances of the distinct linear groups from an origin. In these examples, a number of the parallel groups is determined based on an approximation parameter and/or a tolerance. Each of the parallel groups includes a list of distinct linear groups that are included in the parallel group and the list is sorted based on the signed distances of the distinct linear groups from the origin. For linear groups that have a same signed distance within a parallel group, ordering is performed based on a projection of a starting point of the linear groups on a y-axis.

As shown in FIG. 4B, the representation 402 includes a glyph "X" and a glyph "A" which each include three clusters of parallel linear groups. For example, the combined group module 204 processes the linear group data 208 to identify the three clusters of parallel linear groups for the glyph "X" and the glyph "A." The glyph "X" includes a first cluster 426 of parallel linear groups, a second cluster 428 of parallel linear groups, and a third cluster 430 of parallel linear groups. The glyph "A" includes a first cluster 432 of parallel linear groups, a second cluster 434 of parallel linear groups, and a third cluster 436 of parallel linear groups. The combined group module 204 attempts to merge or combine the distinct parallel linear groups in each of the clusters to achieve a minimum number of distinct linear groups.

To do so in one example, the combined group module 204 checks for collinearity between distinct linear groups included in each of the clusters 426, 428, 430 for the glyph "X" and combines the distinct linear groups as a single combined group. In a similar manner, the combined group module 204 checks for collinearity between distinct linear groups included in each of the clusters 432, 434, 436 for the glyph "A" and combines the distinct linear groups as a single combined group. When combining the distinct linear groups, the combined group module 204 first extracts a best pair of distinct linear groups to combine, then combines the best pair of distinct linear groups, and then repeats the process. To determine the best pair of distinct linear groups to combine, the combined group module 204 performs a best collinear pair search based on a best collinearity search criterion. The best collinearity search criterion is based on four different parameters including a length constraint, collinearity, an overlap constraint, and a projection error.

The combined group module 204 uses the length constraint to minimize a search space by eliminating potential combinations of pairs of distinct linear groups which have a combined length greater than a threshold. This threshold is a percentage of a dimension of the glyph "X" for eliminating combinations of distinct linear groups included in the clusters 426, 428, 430, and the threshold is a percentage of a dimension of the glyph "A" for eliminating combinations of distinct linear groups included in the clusters 432, 434, 436. For example, the combined group module 204 leverages the length constraint first because it significantly reduces the search space and is performable using minimal processing and computing resources. In some examples, the combined group module 204 also computes projection errors (described with respect to FIGS. 5H and 5I) to eliminate combinations of distinct linear groups with error scores above a maximum error score.

FIGS. 4C, 4D, and 4E illustrate examples of almost collinear detection. With reference to FIG. 4C, the representation 404 includes a first linear group 438 and a second linear group 440 and the combined group module 204 determines a first angle between the first linear group 438 and a coordinate axis. The combined group module 204 also determines a second angle between the second linear group 440 and the coordinate axis.

In the illustrated example, the representation 404 includes a joining segment 442. For example, the joining segment 442 connects an endpoint of the first linear group 438 with a point of the second linear group 440 such that a length of the joining segment 442 is minimized. In one example, the point of the second linear group 440 is a nearest point included in the second linear group 440 to the end point of the first linear group 438. The combined group module 204 determines a third angle between the joining segment 442 and the coordinate axis.

Consider an example in which the combined group module 204 leverages the first angle, the second angle, and the third angle to identify relationships between the first linear group 438 and the second linear group 440. In this example, the first angle is approximately equal to the second angle which indicates that the first linear group 438 and the second linear group 440 are almost parallel. The first angle is not approximately equal to the third angle which indicates that the first linear group 438 and the second linear group 440 are not almost collinear.

To quantify a potential combination of the first linear group 438 and the second linear group 440, the combined group module 204 determines a difference between the first angle and the second angle, a difference between the first angle and the third angle, and a difference between the second angle and the third angle. The combined group module 204 identifies a maximum one of the determined differences between the angles and compares the maximum determined difference with a collinearity error threshold. If the maximum determined difference is less than the collinearity error threshold, then the combined group module 204 returns the maximum determined difference as a metric for quantifying the potential combination of the first linear group 438 and the second linear group 440.

With reference to FIG. 4D, the representation 406 includes the first linear group 438 and the second linear group 440. For example, the combined group module 204 determines the first angle between the first linear group 438 and the coordinate axis and also determines the second angle between the second linear group 440 and the coordinate axis. In this example the first angle is not approximately equal to the second angle which indicates that the first linear group 438 is not almost parallel with the second linear group 440. This also indicates that the first linear group 438 and the second linear group 440 are not almost collinear. The combined group module 204 determines a difference between the first angle and the second angle and compares this difference to the collinearity error threshold. If the difference between the first angle and the second angle is less than the collinearity error threshold, then the combined group module 204 returns the difference between the first angle and the second angle as the metric for quantifying the potential combination of the first linear group 438 and the second linear group 440.

With reference to FIG. 4E, the representation 408 includes the first linear group 438, the second linear group 440, and the joining segment 442. The combined group module 204 determines the first angle between the first linear group 438 and the coordinate axis, the second angle between the second linear group 440 and the coordinate axis, and the third angle between the joining segment 442 and the coordinate axis. As shown, the first angle is approximately equal to the second angle which indicates that the first linear group 438 and the second linear group 440 are almost parallel. The first angle is also approximately equal to the third angle which indicates that the first linear group 438 and the second linear group 440 are almost collinear.

The combined group module 204 determines a maximum of the difference between the first angle and the second angle, the difference between the first angle and the third angle, and the difference between the second angle and the third angle. For example, the combined group module 204 compares the maximum determined difference to the collinearity error threshold. If the maximum determined difference is less than the collinearity error threshold, then the combined group module 204 returns the maximum determined difference as the metric for quantifying the potential combination of the first linear group 438 and the second linear group 440. Based on the metrics returned for the first linear group 438 and the second linear group 440 in each of the representations 404, 406, 408, the combined group module 204 determines that the representation 408 includes a best pair of the first linear group 438 and the second linear group 440 for combining as a combined group.

For example, the first linear group 438 corresponds to a first portion of a vector object and the second linear group 440 corresponds to a second portion of the vector object. In a first example, the first portion of the vector object is not adjacent to the second portion of the vector object. In a second example, the first portion of the vector object is adjacent to the second portion of the vector object.

Consider an example of adjacent and/or overlapping linear groups which is illustrated in FIG. 4F. As shown, the representation 410 includes a first linear group 444 and a second linear group 446 which are overlapping. The first linear group 444 and the second linear group 446 are also nearly adjacent as a distance 448 between the first linear group 444 and the second linear group 446 is relatively small. A joining segment 450 connects an endpoint of the first linear group 444 and a point of the second linear group 446.

For example, the combined group module 204 determines a first angle between the first linear group 444 and a coordinate axis, a second angle between the second linear group 446 and the coordinate axis, and a third angle between the joining segment 450 and the coordinate axis. Based on differences between the first angle, the second angle, and the third angle, the almost collinearity detection indicates that the first linear group 444 and the second linear group 446 should be combined as a combined group 452. However, the combined group 452 is not desirable because the first linear group 444 and the second linear group 446 are overlapping and nearly adjacent. To prevent this undesirable combination, the combined group module 204 adds an overlapping constraint before the almost collinearity detection so that overlapping linear groups are not combined. An example of the overlapping constraint is illustrated in FIG. 4G.

As shown in the representation 412, the combined group module 204 identifies overlapping linear groups 454, 456 and prevents these groups from being combined using the overlapping constraint. Although the overlapping linear groups 454 would also be prevented from combining or merging due to the length constraint, the overlapping linear groups 456 would not be prevented from combining or merging due to the length constraint. The representation 412 also includes parallel linear groups 458 which are separated by a large distance such that combining the parallel linear groups 458 creates clutter 460. This clutter 460 is undesirable; however, the overlapping constraint and the almost collinearity detection would not prevent the combination of the parallel linear groups 458 that causes the clutter 460.

Accordingly, the combined group module 204 also applies a Euclidean constraint to prevent linear groups that are separated by a large Euclidean distance from being combined. Consider an example in which the combined group module 204 uses the overlapping constraint and the Euclidean constraint to prevent overlapping linear groups and distant linear groups from being combined or merged. In this example, the combined group module 204 evaluates a first linear group A and a second linear group B of sequential points of an outline of a glyph for potential combination. The combined group module 204 determines a height of the glyph's bounding box and defines h to equal one half of the height of the glyph's bounding box. Similarly, the combined group module 204 determines a width of the glyph's bounding box and defines w to equal one half of the width of the glyph's bounding box.

Continuing this example, the combined group module 204 defines a distance d to equal a minimum of h and w. The combined group module 204 projects a first linear approximation line A' through the sequential points included in the first linear group A and projects a second linear approximation line B' through the sequential points included in the second linear group B. For example, the combined group module 204 determines that a length of the first linear approximation line A' is less than the distance d and also that a length of the second linear approximation line B' is less than the distance d.

The combined group module 204 extracts a1, a2 as endpoints of A' and b1, b2 as endpoints of B'. In an example, the combined group module 204 then computes a distance between a1 and b1 as Ea1b1, a distance between a1 and b2 as Ea1b2, a distance between a2 and b1 as Ea2b1, and a distance between a2 and b2 as Ea2b2. The combined group module 204 determines that the first linear group A and the second linear group B are not overlapping if (Ea1b1≥Ea1b2 and Ea2b1≥Ea2b2) or (Ea1b1<Ea1b2 and Ea2b1<Ea2b2). The combined group module 204 checks if the first linear group A and the second linear group B satisfy the Euclidean constraint by defining error to equal a maximum of Ea1b1, Ea1b2, Ea2b1, and Ea2b2. If error<d, then the combined group module 204 determines that the first linear group A and the second linear group B satisfy the Euclidean constraint. Accordingly, the first linear group A and the second linear group B are combinable as a combined group without creating the clutter 460.

Consider an example in which the combined group module 204 determines which of two possible linear groups to combine with a third linear group as illustrated in FIG. 4H. The representation 414 includes a first linear group 462, a second linear group 464, and a third linear group 466 and the combined group module 204 determines whether to combine the first linear group 462 and the third linear group 466 or to combine the second linear group 464 and the third linear group 466. As shown, a misalignment 468 between the first linear group 462 and the third linear group 466 creates clutter 470 if the first linear group 462 and the third linear group 466 are combined. To avoid this, the combined group module 204 computes projection error as illustrated in FIG. 4I.

Consider an example in which the combined group module 204 computes a projection error between the first linear group A and the second linear group B. In this example, the combined group module 204 defines AngleA to equal an angle of the first linear approximation line A' with respect to a coordinate axis and also defines AngleB to equal an angle of the second linear approximation line B' with respect to the coordinate axis. The combined group module 204 computes AvgAngle to equal an average value of AngleA and AngleB. For example, the combined group module 204 generates A" by rotating the first linear approximation line A' until it is parallel to AvgAngle. Similarly, the combined group module 204 generates B" by rotating the second linear approximation line B' until it is parallel to AvgAngle. Accordingly, A" and B" are parallel. The combined group module 204 computes the projection error as a distance between A" and B".

As shown in the representation 416 a projection error 472 for the first linear group 462 is greater than a projection error 474 for the second linear group 464. Because the projection error is lowest for the second linear group 464, the combined group module 204 combines the second linear group 464 and the third linear group 466 instead of combining the first linear group 462 and the third linear group 466. With reference to FIG. 2, the combined group module 204 generates the combined group data 210 as describing combined groups of the linear groups described by the linear group data 208. The display module 206 receives the combined group data 210 and processes the combined group data 210 to display an augmented vector object having indications of perceptual linear regions generated based on the combined groups described by the combined group data 210. For example, if the vector object is a glyph of a font, then the display module 206 displays an augmented glyph having indications of perceptual linear regions generated based on the combined groups described by the combined group data 210.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4. FIG. 5 is a flow diagram depicting a procedure 500 in an example implementation in which input data describing an outline of a vector object is received and an indication of a perceptual linear region of the vector object is generated for display in a user interface. Input data is received describing an outline of a vector object (block 502). For example, the computing device 102 implements the linear region module 110 to receive the input data. Differences between sequential points of the outline and linear approximation lines projected through the sequential points are determined (block 504). The linear region module 110 determines the differences between the sequential points and the linear approximation lines in one example.

The sequential points are grouped into linear groups based on the differences (block 506). In an example, the computing device 102 implements the linear region module 110 to group the sequential points into the linear groups. A first linear group and a second linear group of the linear groups are combined into a combined group based on a linearity constraint (block 508). For example, the linear region module 110 combines the first linear group and the second linear group into the combined group. An indication of a perceptual linear region of the vector object is generated for display in a user interface based on the combined group (block 510). In one example, the linear region module 110 generates the indication of the perceptual linear region of the vector object based on the combined group.

Figure 6:
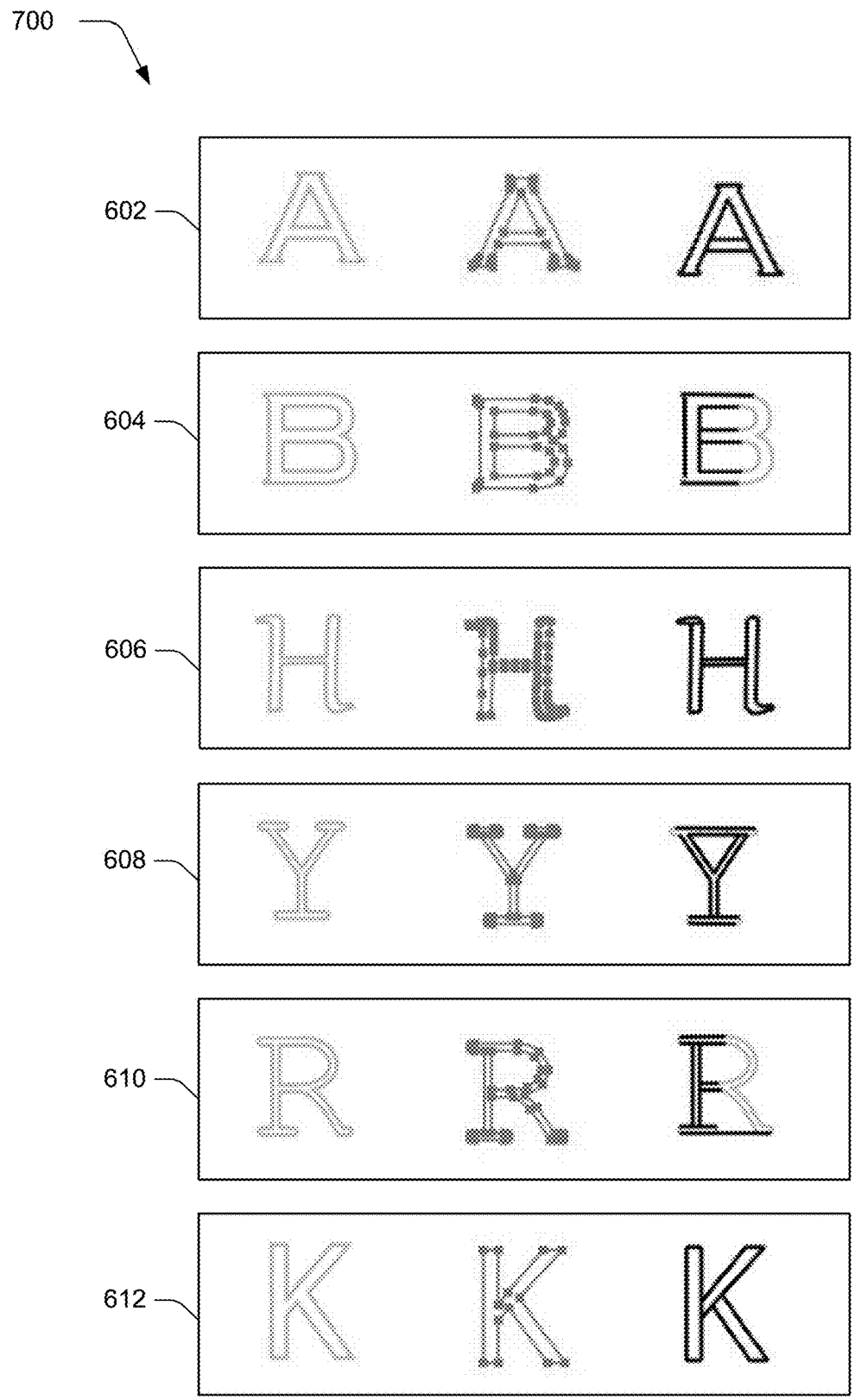
FIG. 6 illustrates a representation of example indications of perceptual linear regions generated for vector objects.

FIG. 6 illustrates a representation 600 of example indications of perceptual linear regions generated for vector objects. As shown, the representation 600 includes examples 602-612. Example 602 includes a glyph (left) which is an "A" and also includes an outline (center) of the glyph. For example, the linear region module 110 groups sequential points of the outline into linear groups and combines the linear groups into combined groups to generate an augmented glyph (right). The augmented glyph includes nine indications of perceptual linear regions of the glyph based on the combined groups.

For example, the linear region module 110 displays the nine indications of perceptual linear regions as snap guides which are regions defined in a user interface (e.g., the user interface 120) and which relocate a cursor or a portion of a digital object that is within a threshold proximity of the regions to collocate the cursor or the portion of the digital object with the regions. In this example, a user interacts with an input device (a mouse, a keyboard, a stylus, a microphone, etc.) to snap a cursor to one indication of the nine indications of perceptual linear regions. In this manner and through further interaction with the input device, the one indication of perceptual linear region is usable to precisely align the augmented glyph with another glyph, a graphic object, and so forth.

Example 604 includes a glyph (left) which is a "B." An outline (center) of the glyph is also included in the example 604. In one example, the linear region module 110 groups sequential points of the outline into linear groups. These linear groups are then combined into combined groups to generate an augmented glyph (right). As shown, the augmented glyph includes eight indications of perceptual linear regions of the glyph. For example, the eight indications are snap guides usable to precisely align the augmented glyph with another glyph or a graphic object.

Example 606 includes a glyph (left). This glyph is an "H" and the example 606 also includes an outline (center) of the glyph. The linear region module 110 groups sequential points of the outline into linear groups and combines the linear groups into combined groups based on a linearity constraint. For example, the linearity constraint ensures that linear groups which are overlapping are not combined. The linear region module 110 generates an augmented glyph (right) based on the combined groups. This augmented glyph includes 10 indications of perceptual linear regions of the glyph.

Example 608 includes a glyph (left) which is a "Y" and also includes an outline (center) of the glyph. For example, the linear region module 110 groups sequential points of the outline into linear groups and combines the linear groups into combined groups to generate an augmented glyph (right). The augmented glyph includes eight indications of perceptual linear regions of the glyph based on the combined groups.

Example 610 includes a glyph (left) which is an "R." An outline (center) of the glyph is also included in the example 610. In an example, the linear region module 110 groups sequential points of the outline into linear groups. These linear groups are then combined into combined groups to generate an augmented glyph (right). As shown, the augmented glyph includes eight indications of perceptual linear regions of the glyph. In some examples, the eight indications are snap guides usable to precisely align the augmented glyph with another glyph or a graphic object.

Example 612 includes a glyph (left). This glyph is a "K" and the example 612 also includes an outline (center) of the glyph. The linear region module 110 groups sequential points of the outline into linear groups and combines the linear groups into combined groups based on a linearity constraint. For example, the linearity constraint ensures that linear groups which are separated by Euclidean distances greater than a threshold distance are not combined. The linear region module 110 generates an augmented glyph (right) based on the combined groups. This augmented glyph includes 10 indications of perceptual linear regions of the glyph.

Although the examples 602-612 are described with respect to glyphs, the described systems are not limited to generating indications of perceptual linear regions of glyphs. Rather, the linear region module 110 is capable of generating indications of perceptual linear regions of any vector object that is representable by points of an outline. Accordingly, the described systems are capable of generating indications of perceptual linear regions of glyphs of a font, edges of graphic objects, and so forth.

Example System and Device

Figure 7:
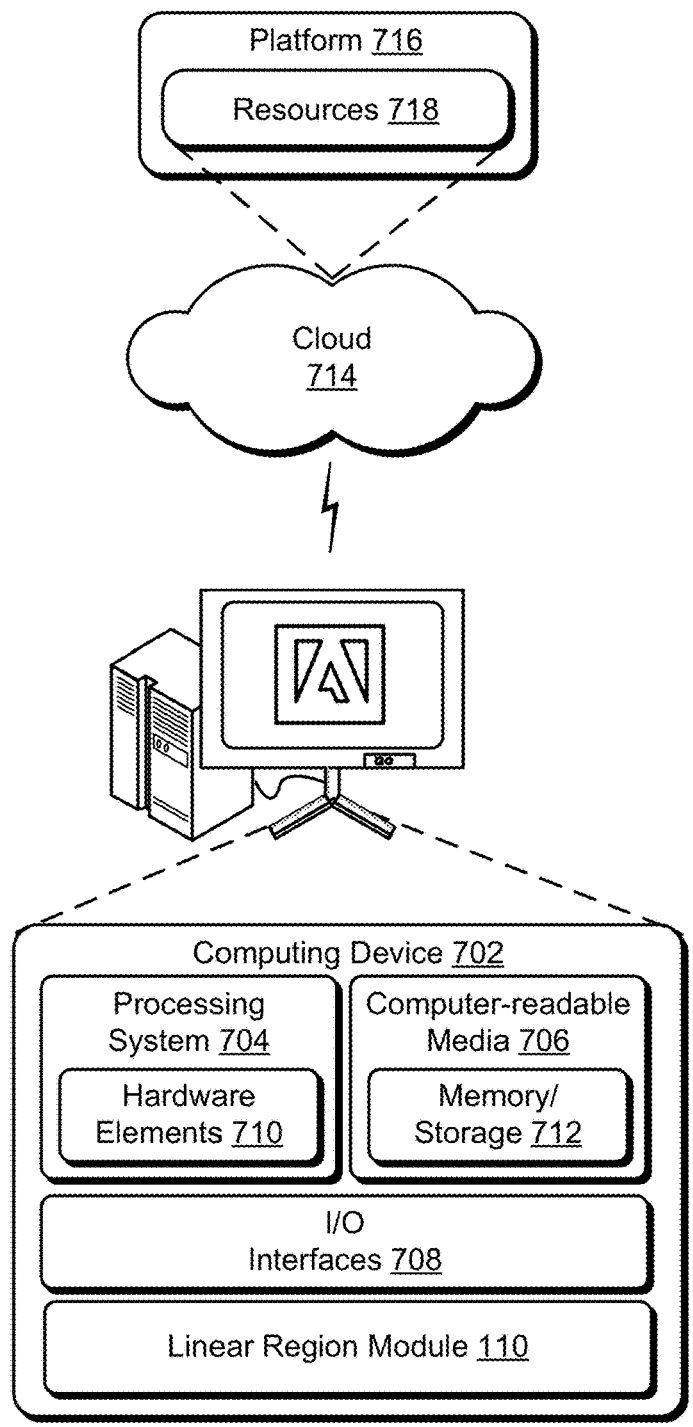
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the linear region module 110. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

CONCLUSION

Although implementations of systems for generating indications of perceptual linear regions of vector objects have been described in language specific to structural features and/or methods, it is to be understood that the appended claims are not necessarily limited to the specific features or methods described. Rather, the specific features and methods are disclosed as example implementations of systems for generating indications of perceptual linear regions of vector objects, and other equivalent features and methods are intended to be within the scope of the appended claims. Further, various different examples are described and it is to be appreciated that each described example is implementable independently or in connection with one or more other described examples.

What is claimed is:

1. In a digital medium environment, a method implemented by a processing device, the method comprising:
   receiving, by the processing device, input data describing an outline of a vector object;
   determining, by the processing device, differences between sequential points of the outline and linear approximation lines projected through the sequential points;
   removing, by the processing device, short linear segments of the sequential points that are less than a first threshold length;
   grouping, by the processing device, the sequential points into linear groups based on the differences;
   determining, by the processing device, a combined length of a first linear group and a second linear group of the linear groups does not exceed a second threshold length;
   combining, by the processing device, the first linear group and the second linear group of the linear groups into a combined group based on the combined length and a linearity constraint; and
   generating, by the processing device for display in a user interface, an indication of a perceptual linear region of the vector object based on the combined group.

2. The method as described in claim 1, wherein the vector object is a glyph of a font.

3. The method as described in claim 1, wherein the linearity constraint is a projection error computed by determining differences between sequential points included in the first linear group and a linear approximation line projected through sequential points included in the second linear group.

4. The method as described in claim 1, wherein the linearity constraint is a slope similarity computed by determining a difference between a slope of a first linear approximation line projected through sequential points included in the first linear group and a slope of a second linear approximation line projected through sequential points included in the second linear group.

5. The method as described in claim 1, wherein the linearity constraint is a collinearity error computed based on a first angle between a first linear approximation line projected through sequential points included in the first linear group and a coordinate axis, a second angle between a second linear approximation line projected through sequential points included in the second linear group and the coordinate axis, and a third angle between a third linear approximation line projected through sequential points included in the combined group and the coordinate axis.

6. The method as described in claim 5, wherein the collinearity error is equal to a maximum of a difference between the first angle and the second angle, a difference between the first angle and the third angle, and a difference between the second angle and the third angle.

7. The method as described in claim 1, wherein the linearity constraint is a maximum length of the combined group.

8. The method as described in claim 7, wherein the maximum length is equal to a percentage of a dimension of the vector object.

9. The method as described in claim 1, wherein the linearity constraint is a maximum Euclidean distance between the first linear group and the second linear group.

10. The method as described in claim 1, wherein the first linear group corresponds to a first portion of the vector object and the second linear group corresponds to a second portion of the vector object and the first portion is not adjacent to the second portion.

11. A system comprising:
   one or more processors implemented at least partially in hardware; and
   one or more computer-readable storage media storing instructions that are executable by the one or more processors to:
     receive input data describing an outline of a vector object;
     determine differences between sequential points of the outline and linear approximation lines projected through the sequential points; and
     remove short linear segments of the sequential points that are less than a first threshold length;
     group the sequential points into linear groups based on the differences;
     determine a combined length of a first linear group and a second linear group of the linear groups does not exceed a second threshold length;
     combine the first linear group and the second linear group of the linear groups into a combined group based on the combined length and a linearity constraint; and
     generate, for display in a user interface, an indication of a perceptual linear region of the vector object based on the combined group.

12. The system as described in claim 11, wherein the vector object is a glyph of a font.

13. The system as described in claim 11, wherein the perceptual linear region is not a geometrically linear region of the vector object.

14. The system as described in claim 11, wherein the first linear group corresponds to a first portion of the vector object and the second linear group corresponds to a second portion of the vector object and wherein the first portion of the vector object is adjacent to the second portion of the vector object.

15. The system as described in claim 11, wherein the first linear group corresponds to a first portion of the vector object and the second linear group corresponds to a second portion of the vector object and wherein the first portion of the vector object is not adjacent to the second portion of the vector object.

16. One or more computer-readable storage media comprising instructions stored thereon that, responsive to execution by a computing device, causes the computing device to perform operations including:
   receiving input data describing an outline of a vector object;
   determining differences between sequential points of the outline and linear approximation lines projected through the sequential points;
   removing short linear segments of the sequential points that are less than a first threshold length;
   grouping the sequential points into linear groups based on the differences;
   determining a combined length of a first linear group and a second linear group of the linear groups does not exceed a second threshold length;
   combining the first linear group and the second linear group of the linear groups into a combined group based on the combined length and a linearity constraint; and
   generating, for display in a user interface, an indication of a perceptual linear region of the vector object based on the combined group.

17. The one or more computer-readable storage media as described in claim 16, wherein the vector object is a glyph of a font and the combined group corresponds to a portion of the glyph.

18. The one or more computer-readable storage media as described in claim 17, wherein the indication of the perceptual linear region is a snap guide that relocates a cursor or a portion of a digital object that is within a threshold proximity of the portion of the glyph to collocate the cursor or the portion of the digital object with the portion of the glyph in the user interface.

19. The one or more computer-readable storage media as described in claim 16, wherein the linearity constraint is a collinearity error computed based on a first angle between a first linear approximation line projected through sequential points included in the first linear group and a coordinate axis, a second angle between a second linear approximation line projected through sequential points included in the second linear group and the coordinate axis, and a third angle between a third linear approximation line projected through sequential points included in the combined group and the coordinate axis.

20. The one or more computer-readable storage media as described in claim 16, wherein the linearity constraint is an overlapping constraint determined by comparing distances between endpoints of a first linear approximation line projected through sequential points included in the first linear group and endpoints of a second linear approximation line projected through sequential points included in the second linear group.

* * * * *

UNITED STATES PATENT AND TRADEMARK OFFICE
CERTIFICATE OF CORRECTION

| | | |
|---|---|---|
| PATENT NO. | : 11,417,036 B1 | |
| APPLICATION NO. | : 17/324337 | |
| DATED | : August 16, 2022 | |
| INVENTOR(S) | : Arushi Jain, Praveen Kumar Dhanuka and Matthew David Fisher | |

It is certified that error appears in the above-identified patent and that said Letters Patent is hereby corrected as shown below:

In the Claims

Column 22 Line 51, after "sequential points;", delete "and".

Signed and Sealed this
Eighth Day of November, 2022

*Katherine Kelly Vidal*
Katherine Kelly Vidal
*Director of the United States Patent and Trademark Office*